US011862903B2

United States Patent
Bhasin et al.

(10) Patent No.: US 11,862,903 B2
(45) Date of Patent: Jan. 2, 2024

(54) DEVICE CHARGER

(71) Applicant: 10757616 CANADA CORPORATION, Edmonton (CA)

(72) Inventors: Sunny Bhasin, Edmonton (CA); Daniel Budurea, Mississauga (CA); Igor Pevzner, Concord (CA); Andrzej Smereka, Milton (CA)

(73) Assignee: 10757616 CANADA CORPORATION, Edmonton (CA)

( * ) Notice: Subject to any disclaimer, the term of this patent is extended or adjusted under 35 U.S.C. 154(b) by 750 days.

(21) Appl. No.: 16/982,918

(22) PCT Filed: Mar. 19, 2019

(86) PCT No.: PCT/IB2019/052234
§ 371 (c)(1),
(2) Date: Sep. 21, 2020

(87) PCT Pub. No.: WO2019/180620
PCT Pub. Date: Sep. 26, 2019

(65) Prior Publication Data
US 2021/0013725 A1 Jan. 14, 2021

Related U.S. Application Data

(60) Provisional application No. 62/667,684, filed on May 7, 2018, provisional application No. 62/646,909, filed on Mar. 23, 2018.

(51) Int. Cl.
*H01R 13/66* (2006.01)
*H02J 50/10* (2016.01)
(Continued)

(52) U.S. Cl.
CPC ..... *H01R 13/6675* (2013.01); *H01F 27/2804* (2013.01); *H01F 27/323* (2013.01);
(Continued)

(58) Field of Classification Search
CPC .................................................. H01R 13/6675
(Continued)

(56) References Cited

U.S. PATENT DOCUMENTS

| 6,293,485 | B1 | 9/2001 | Hollowed |
| 6,423,900 | B1* | 7/2002 | Soules .................... H01R 24/78 |

(Continued)

FOREIGN PATENT DOCUMENTS

| JP | 3078427 U | 7/2001 |
| JP | 2001309562 A | 11/2001 |

(Continued)

OTHER PUBLICATIONS

"International Search Report and Written Opinion", dated Jun. 25, 2019, issued in corresponding PCT Application No. PCT/IB2019/052234, filed Mar. 19, 2019.

*Primary Examiner* — Jerry D Robbins
(74) *Attorney, Agent, or Firm* — FIELD LLP

(57) ABSTRACT

A device charger is provided. The device charger includes: a faceplate having an electrical outlet-sized aperture therethrough, the faceplate comprising an electrical circuit; a first body extending from a rear side of the faceplate, the first body comprising an AC-to-DC power supply; a second body extending from the rear side of the faceplate, the first body and the second body including respective electrical contacts located to electrically contact one or more respective electrical outlet terminals, the respective electrical contacts configured to provide alternating current from the terminals to an AC input of the power supply at least partially via the electrical circuit of the faceplate; and at least one electrical connector, located at a front side of the faceplate, connected to a DC output of the power supply, the at least one electrical connector for providing DC power to an external device connected thereto.

20 Claims, 27 Drawing Sheets

(51) Int. Cl.
*H01F 27/28* (2006.01)
*H01F 27/32* (2006.01)
*H01R 13/72* (2006.01)
*H01R 13/73* (2006.01)
*H02G 3/08* (2006.01)
*H02J 7/00* (2006.01)
*H02J 7/04* (2006.01)
*H02M 7/00* (2006.01)
*H02G 3/14* (2006.01)
*H02J 3/14* (2006.01)
*H02J 7/02* (2016.01)

(52) U.S. Cl.
CPC ............ *H01R 13/72* (2013.01); *H01R 13/73* (2013.01); *H02G 3/081* (2013.01); *H02G 3/14* (2013.01); *H02J 7/0042* (2013.01); *H02J 7/0045* (2013.01); *H02J 7/04* (2013.01); *H02J 50/10* (2016.02); *H02M 7/003* (2013.01); *H01F 2027/2809* (2013.01); *H02J 3/14* (2013.01); *H02J 7/02* (2013.01); *H02J 2207/20* (2020.01)

(58) Field of Classification Search
USPC ......................................................... 320/108
See application file for complete search history.

(56) References Cited

U.S. PATENT DOCUMENTS

| | | | |
|---|---|---|---|
| 7,710,748 B2 | 5/2010 | Young | |
| 8,298,003 B2 | 10/2012 | Wu | |
| 9,035,180 B2* | 5/2015 | Smith | H02G 3/14 |
| 9,362,728 B2 | 6/2016 | Smith et al. | |
| 9,431,914 B2 | 8/2016 | Freeman et al. | |
| D781,241 S | 3/2017 | Knight | |
| 9,882,318 B2 | 1/2018 | Smith et al. | |
| 9,882,361 B2* | 1/2018 | Smith | H05B 45/00 |
| D810,697 S | 2/2018 | Smith | |
| 2011/0216560 A1 | 9/2011 | Ye | |
| 2013/0032594 A1* | 2/2013 | Smith | H05K 5/03 |
| | | | 220/241 |
| 2013/0244475 A1 | 9/2013 | Sayadi et al. | |
| 2014/0030912 A1* | 1/2014 | Cohen | H01R 31/065 |
| | | | 439/529 |
| 2014/0306661 A1 | 10/2014 | Rosenblum et al. | |
| 2015/0075836 A1* | 3/2015 | Smith | H02G 3/14 |
| | | | 174/66 |
| 2015/0229079 A1 | 8/2015 | Smith et al. | |
| 2016/0380446 A1 | 12/2016 | Loewen | |
| 2017/0214188 A1* | 7/2017 | Smith | H05B 45/00 |
| 2017/0324200 A1 | 11/2017 | Gorin et al. | |
| 2018/0048099 A1* | 2/2018 | Diotte | H01R 13/748 |
| 2018/0303002 A1* | 10/2018 | Liao | H01R 4/4809 |
| 2019/0122832 A1 | 4/2019 | Smith | |
| 2019/0148892 A1 | 5/2019 | Smith et al. | |

FOREIGN PATENT DOCUMENTS

| | | |
|---|---|---|
| JP | 2009259922 A | 11/2009 |
| JP | 3171471 U | 11/2011 |
| JP | 3176970 U | 7/2012 |
| JP | 2016504907 A | 2/2016 |
| JP | 2017004889 A | 1/2017 |

* cited by examiner

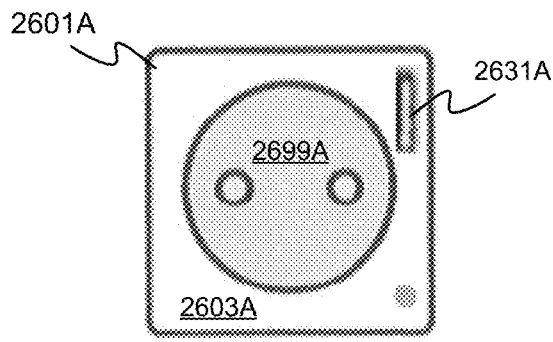
FIG. 26A
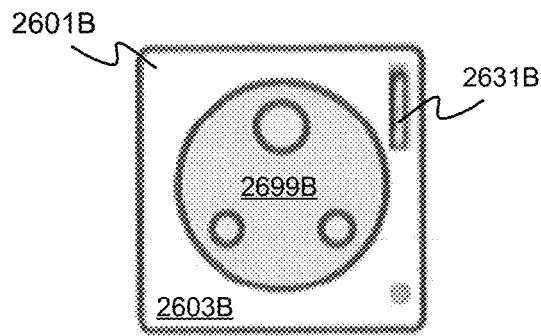
FIG. 26B
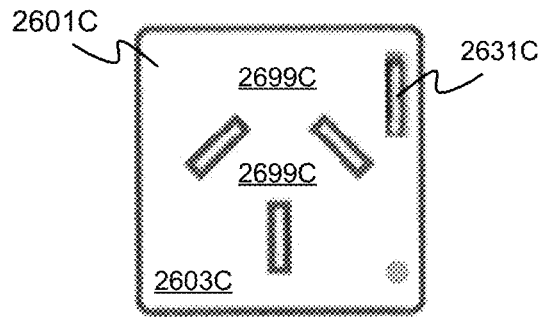
FIG. 26C
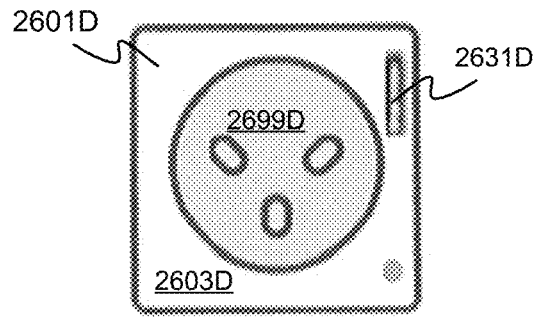
FIG. 26D
FIG. 26

DEVICE CHARGER

CROSS-REFERENCE TO RELATED APPLICATIONS

This application claims priority from: U.S. Provisional Patent Application No. 62/646,909, filed Mar. 23, 2018; and U.S. Provisional Patent Application No. 62/667,684 filed May 7, 2018. The contents of each of the above applications is incorporated herein by reference.

BACKGROUND

Charging of electronic devices, such as cell phones, mobile devices, tablets, laptops, and the like, is often performed using purpose-built charging units which plug into wall outlets; however, such purpose-built charging units can easily be lost and/or forgotten and/or may generally not be available. Furthermore, such purpose-built charging units often include cords and/or require cords, which can lead to cord-clutter,

BRIEF DESCRIPTIONS OF THE DRAWINGS

For a better understanding of the various embodiments described herein and to show more clearly how they may be carried into effect, reference will now be made, by way of example only, to the accompanying drawings in which.

Figure 1:
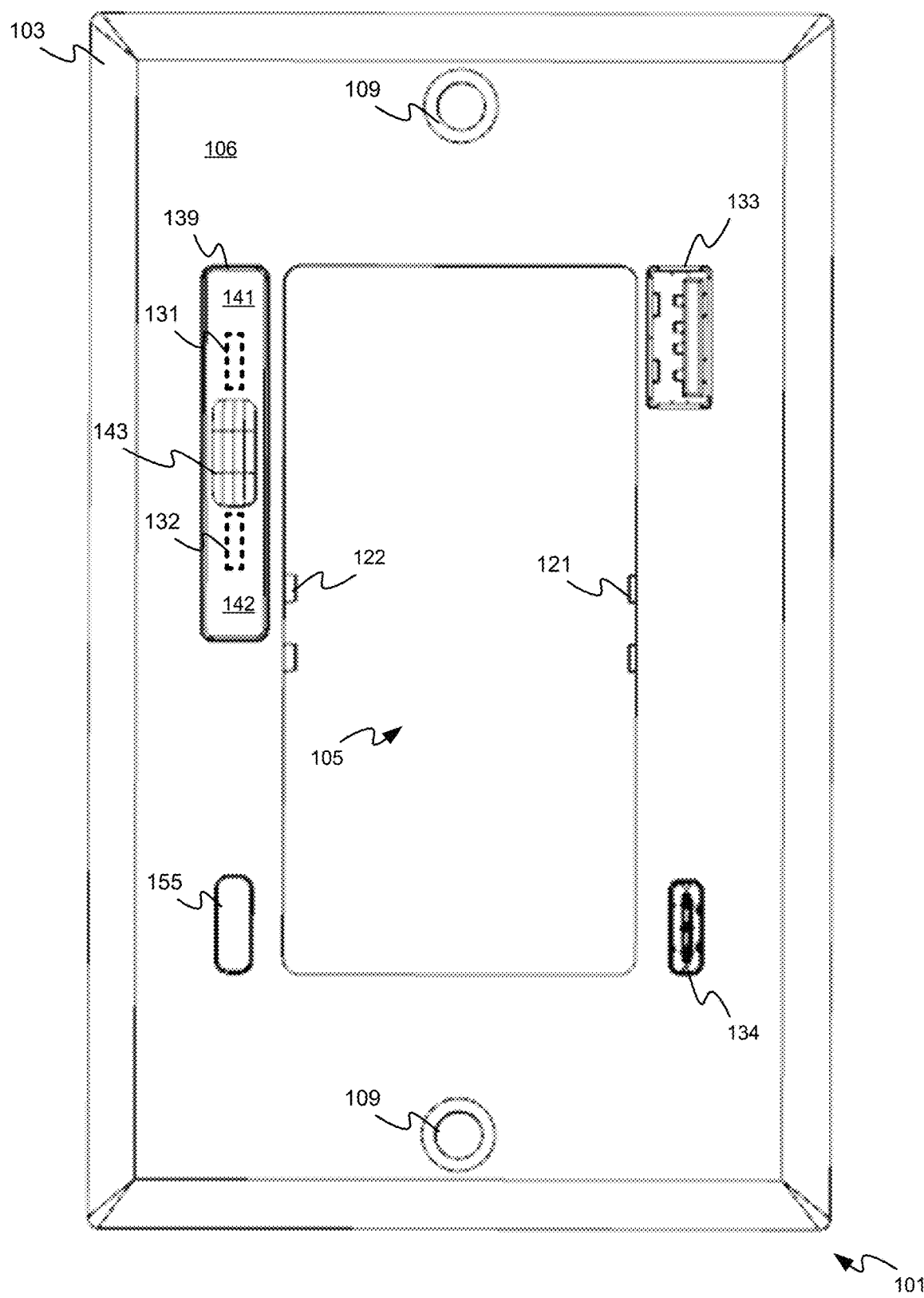
FIG. 1 depicts a front view of a device charger, according to non-limiting embodiments.

FIGS. 26A, 26B, 26C, and 26D each depict a front view of alternative device chargers, according to non-limiting embodiments.

FIGS. 27A, 27B, 27C, and 27D each depict a front view of alternative device chargers, according to non-limiting embodiments.

DETAILED DESCRIPTION

Charging of electronic devices, such as mobile devices, cell phones, tablets, laptops, and the like, is often performed using purpose-built charging units which plug into wall outlets; however, such purpose-built charging units can easily be lost and/or forgotten and/or may generally not be available. Furthermore, such purpose-built charging units often include cords and/or require cords, which can lead to cord-clutter.

An aspect of the specification provides a device comprising: a faceplate having an electrical outlet-sized aperture therethrough, the faceplate comprising an electrical circuit; a first body extending from a rear side of the faceplate, the first body comprising an AC-to-DC (alternating current-to-direct current) power supply; a second body extending from the rear side of the faceplate, the first body and the second body including respective electrical contacts located to electrically contact one or more respective electrical outlet terminals, the respective electrical contacts configured to provide alternating current from the one or more respective electrical outlet terminals to an AC input of the AC-to-DC power supply at least partially via the electrical circuit of the faceplate; and at least one electrical connector, located at a front side of the faceplate, connected to a DC output of the AC-to-DC power supply, the at least one electrical connector for providing DC power to an external device connected thereto.

Another aspect of the specification provides a retraction mechanism comprising: a first geared wheel that includes: a spindle around which a retractable cord wraps; and respective electrical connections around the spindle from the retractable cord to symmetrical concentric multi-ring slip rings configured for electrical communication with a power supply; and a second geared wheel interlocked with the first geared wheel, the second geared wheel including a spring mechanism for providing tension to the first geared wheel, to cause the second geared wheel to rotate the first geared wheel to retract the retractable cord.

Another aspect of the specification provides a power supply comprising: an alternating current (AC) input; a direct current (DC) output a full wave rectifier electrically connected to the AC input; a buck regulator in communication with the full wave rectifier to step down rectified AC voltage to a lower voltage; a push-pull converter, comprised of a chopper circuit in communication with the buck regulator to control a duty cycle of lower voltage rectified AC voltage, and a planar transformer in communication with the chopper circuit to further reduce voltage of the lower voltage rectified AC voltage; a rectifier in communication with the planar transformer to convert electrical output of the planar transformer to direct current voltage, wherein the DC output of the AC-to-DC power supply comprises an output of the rectifier; and a feedback circuit between the DC output and the buck regulator to control the direct current voltage output from the rectifier by controlling the lower voltage output of the buck regulator.

Attention is next directed to FIG. 1, FIG. 2, FIG. 3, FIG. 4, FIG. 5 and FIG. 6 which depict front, back, right, left, bottom and top views of a device charger 101 (interchangeably referred to hereafter as the device 101). As will be explained in detail hereafter, the device 101 is generally configured for installation at a junction box (for example, a North American sized junction box) at which an electrical outlet is already installed and connected to a mains power supply. In particular, an existing faceplate may be removed from the junction box, and the device 101 may be inserted into, and/or attached to, the junction box in place of the removed faceplate. When the device 101 is inserted into the junction box, electrical contacts of the device 101 contact respective electrical outlet terminals of the electrical outlet (e.g. and specifically side electrical terminals of the electrical outlet), providing alternating current (AC) power to a power supply in the device 101 located in a first body that extends from a rear side of the device 101, with the AC power at least partly routed through a faceplate of the device 101. The power supply of the device charger converts the AC power to direct current (DC) power, and the DC power is routed to electrical connectors at the front side of the device 101. The electrical connectors may comprise one or more electrical ports and/or one or more connectors (e.g. male connectors) attached to a retractable cord; in examples that include the retractable cord, a retraction mechanism for the retractable cord may be contained in a second body that also extends from the rear side of the device 101. The device 101 is now described in more detail.

Figure 11:
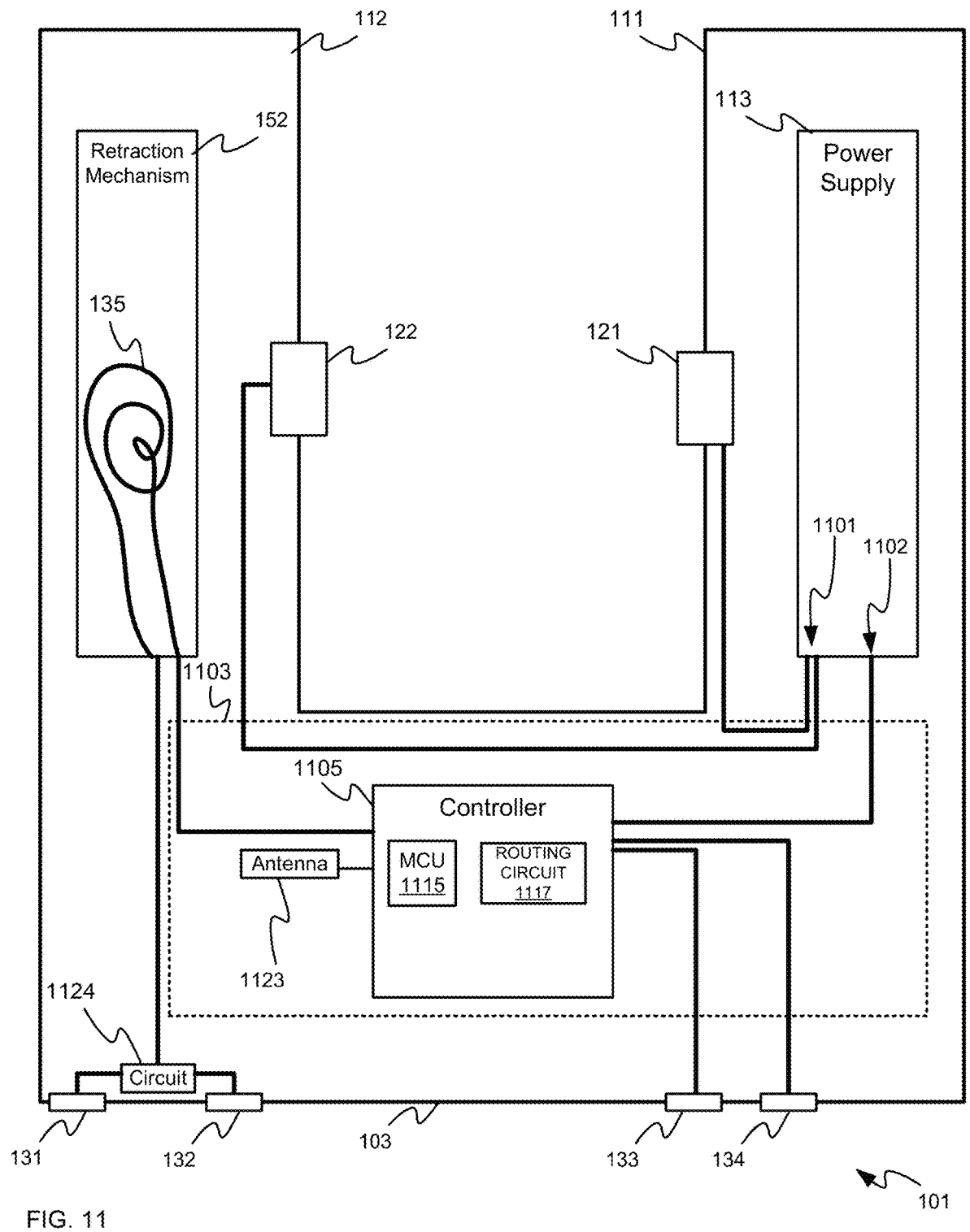
FIG. 11 depicts a schematic of electrical components of the device charger, according to non-limiting embodiments.
Figure 12:
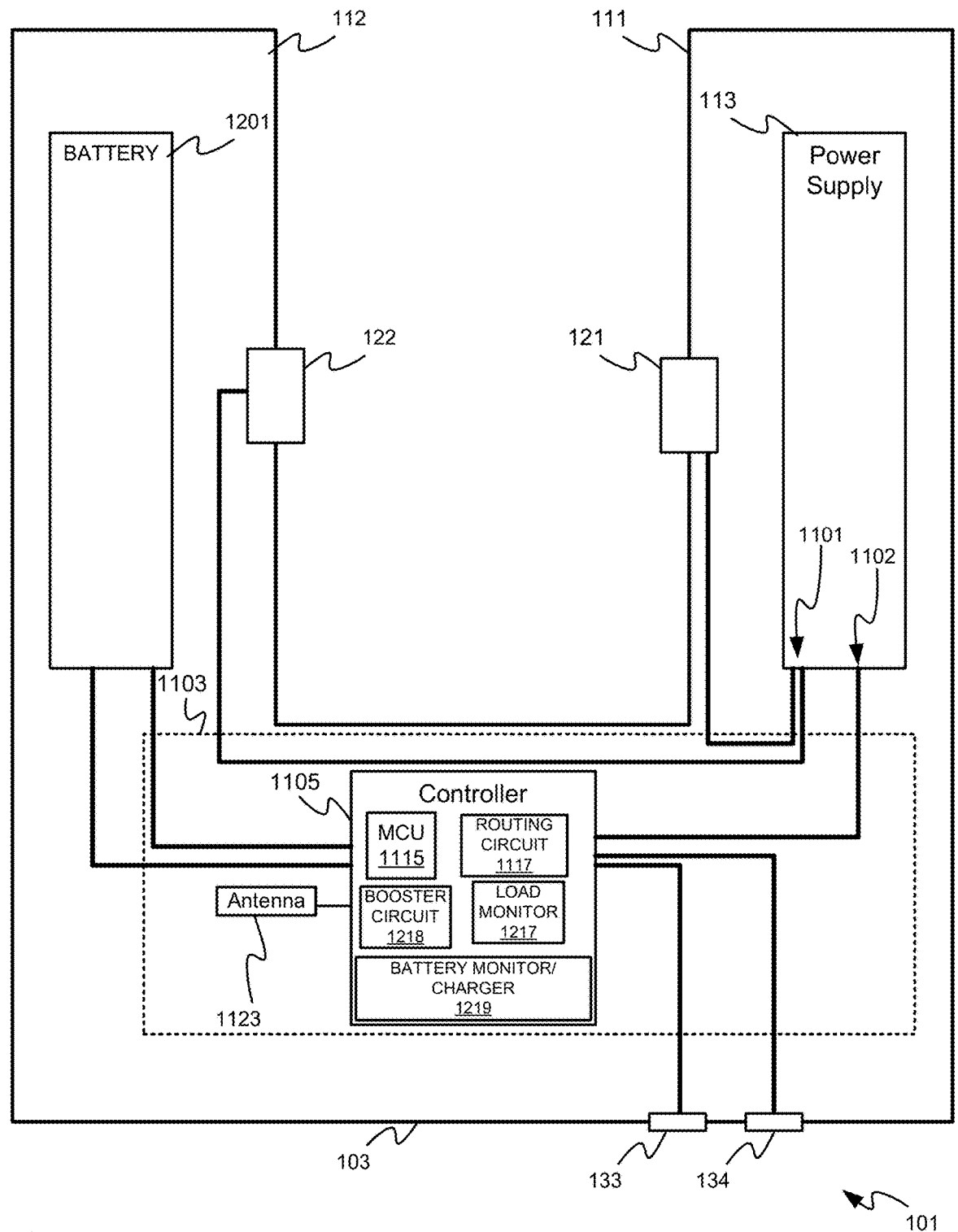
FIG. 12 depicts a schematic of electrical components of a device charger that includes a battery, according to non-limiting embodiments.

As depicted, the device 101 comprises: a faceplate 103 having an electrical outlet-sized aperture 105 (interchangeably referred to hereafter as the aperture 105) therethrough, the faceplate 103 comprising an electrical circuit (e.g. internal to the faceplate 103 and described in more detail with respect to FIG. 11 and FIG. 12). As depicted, the faceplate 103 has a shape and dimensions of a North American-sized single duplex outlet faceplate and, similarly, the aperture 105 has a shape and size of a North American-sized "decora" style single duplexed outlet. In other examples, the faceplate 103 and aperture 105 may have any suitable size and shape; for example, the aperture 105 may comprise two apertures for respective outlets of a "standard" single duplexed outlet.

Figure 2:
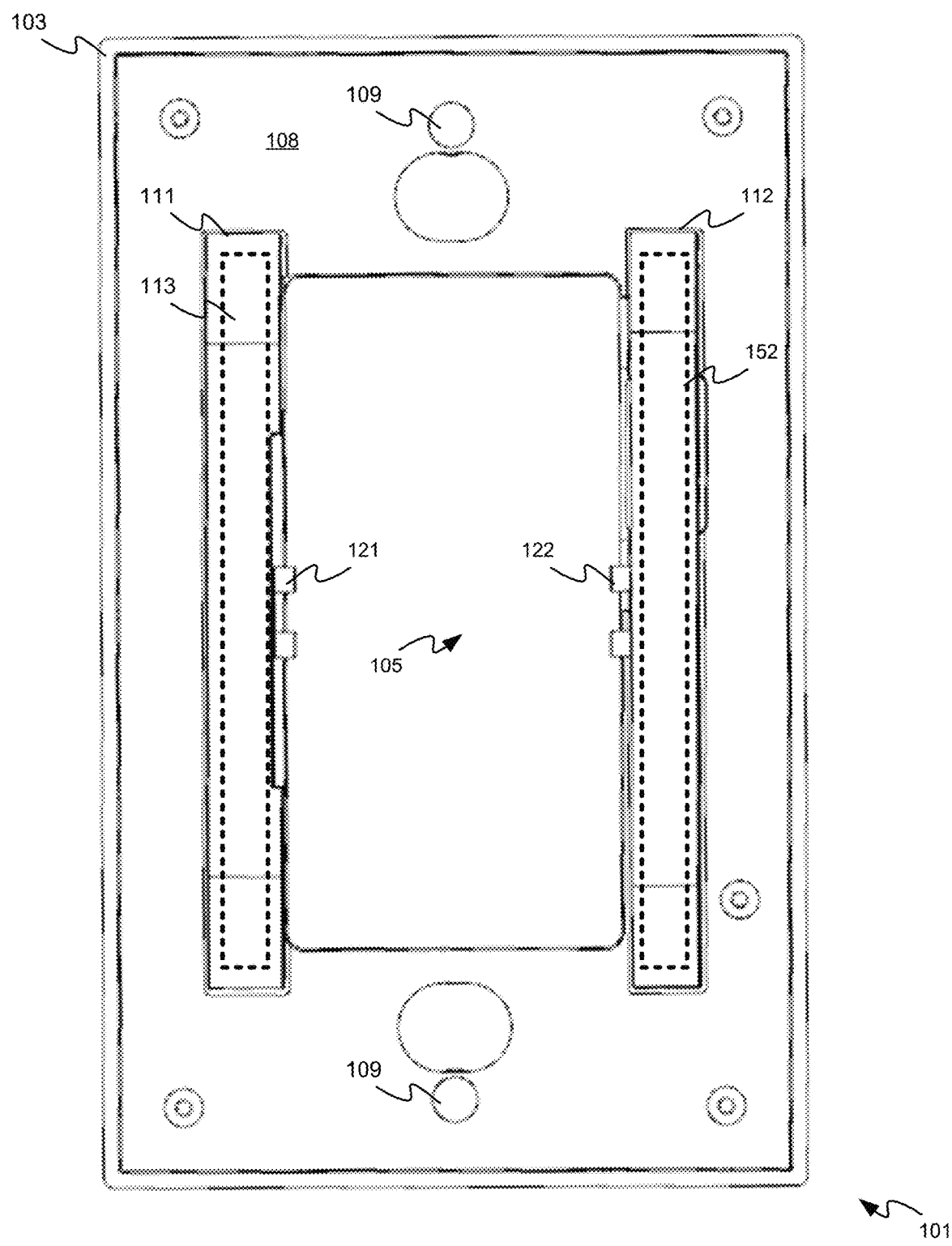
FIG. 2 depicts a rear view of the device charger, according to non-limiting embodiments.

In general, the faceplate 103 comprises a front side 106 (as best seen in FIG. 1), and a rear side 108 (as best seen in FIG. 2) opposite the front side 106. As depicted, the front side 106 is rounded and/or chamfered at an outside edge to both align with a shape and dimensions of a North American-sized single duplex outlet faceplate, and to provide depth to the faceplate 103 to contain the electrical circuit therein, as described below. Indeed, the rear side 108 of the faceplate 103 may comprise an outer side of a printed circuit board (PCB) on which the electrical circuit contained in the faceplate 103 is mounted.

Figure 3:
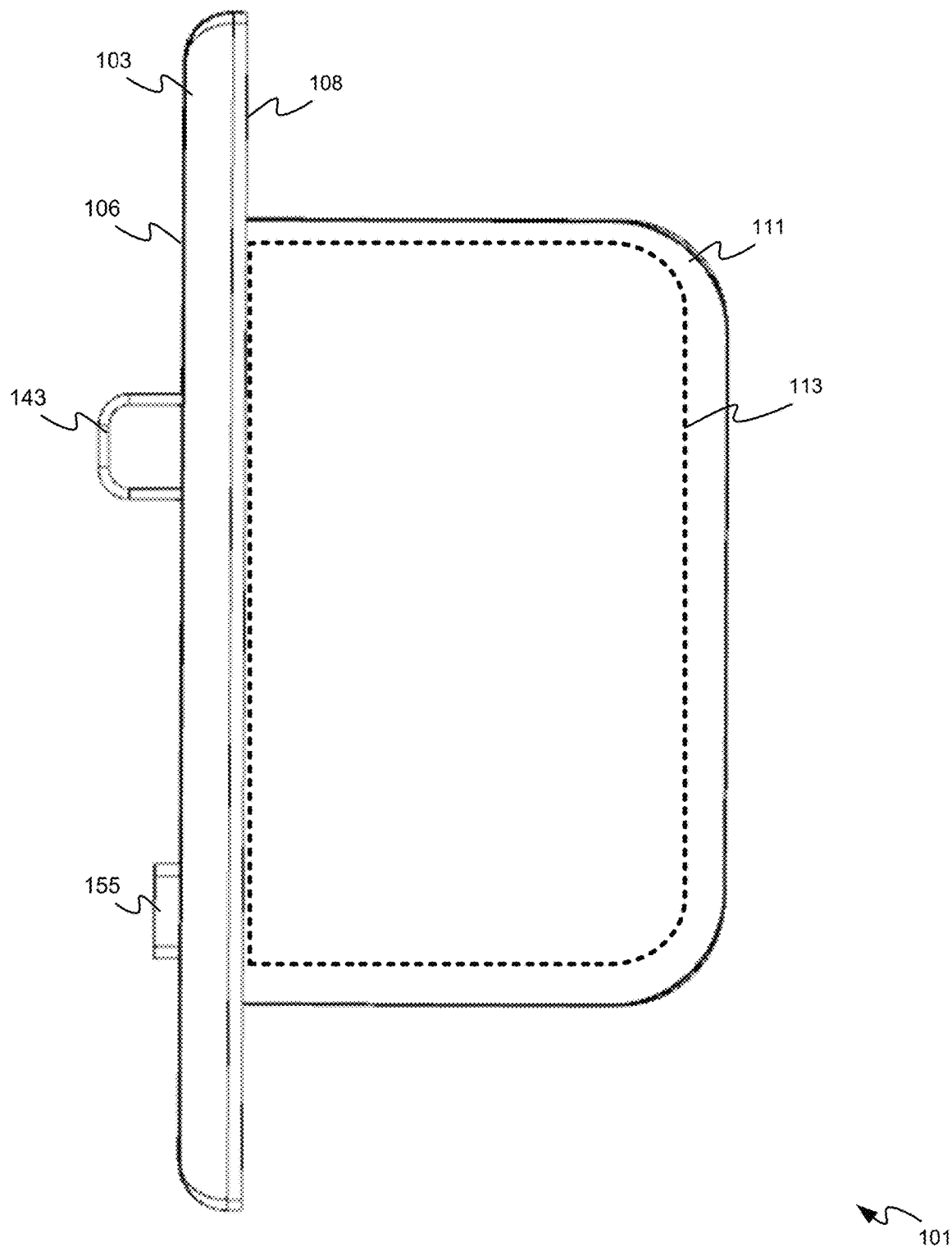
FIG. 3 depicts a right-side view of the device charger, according to non-limiting embodiments.

As best seen in FIG. 2 and FIG. 3, the faceplate 103 further comprises a pair of fastener holes 109 through which fasteners, such as screws and the like, may be inserted to attach the faceplate 103 to an electrical outlet and/or junction box. In particular, as depicted, each of the faceplate 103 and the aperture 105 are rectangularly shaped, and hence each have a long axis and a short axis. The fastener holes 109 are located along the long axis, in positions complementary to respective fastener receptacles of North American electrical outlets and/or junction boxes.

As best seen in FIG. 2, FIG. 3, FIG. 4, FIG. 5 and FIG. 6, the device 101 further comprises: a first body 111 and a second body 112, each extending from the rear side 108 of the faceplate 103. In the depicted examples, the first body 111 and the second body 112 are located on opposite sides of the electrical outlet-sized aperture 105 (for example to allow for an electrical outlet installed in a junction box to fit therebetween. However, in other examples, the first body 111 and the second body 112 may be conjoined and/or at least partially conjoined (e.g. across a top or bottom of the device 101 and/or in other configurations of the device 101, for example for jurisdictions other than North America, the first body 111 and the second body 112 may be at least partially conjoined into a unitary body). In general, the first body 111 and the second body 112 contain different types of electrical components that are at least in partial communication via the electrical circuit of the faceplate 103.

As depicted schematically, in FIG. 2, FIG. 3, FIG. 5 and FIG. 6 the first body 111 comprises an AC-to-DC (alternating current-to-direct current) power supply 113 (interchangeably referred to hereafter as the power supply 113). As depicted, the power supply 113 is contained within the first body 111 and is hence depicted in dashed lines, a convention used throughout the present specification. While any suitable power supply is within the scope of the present specification, a specific example of the power supply 113 is described below with respect to FIG. 13A, FIG. 14, FIG. 15 and FIG. 16. In some examples, components of the AC-to-DC power supply 113 may be located on a printed circuit board (PCB) and enclosed in an overmold material, which also provides rigidity to the first body 111.

Figure 5:
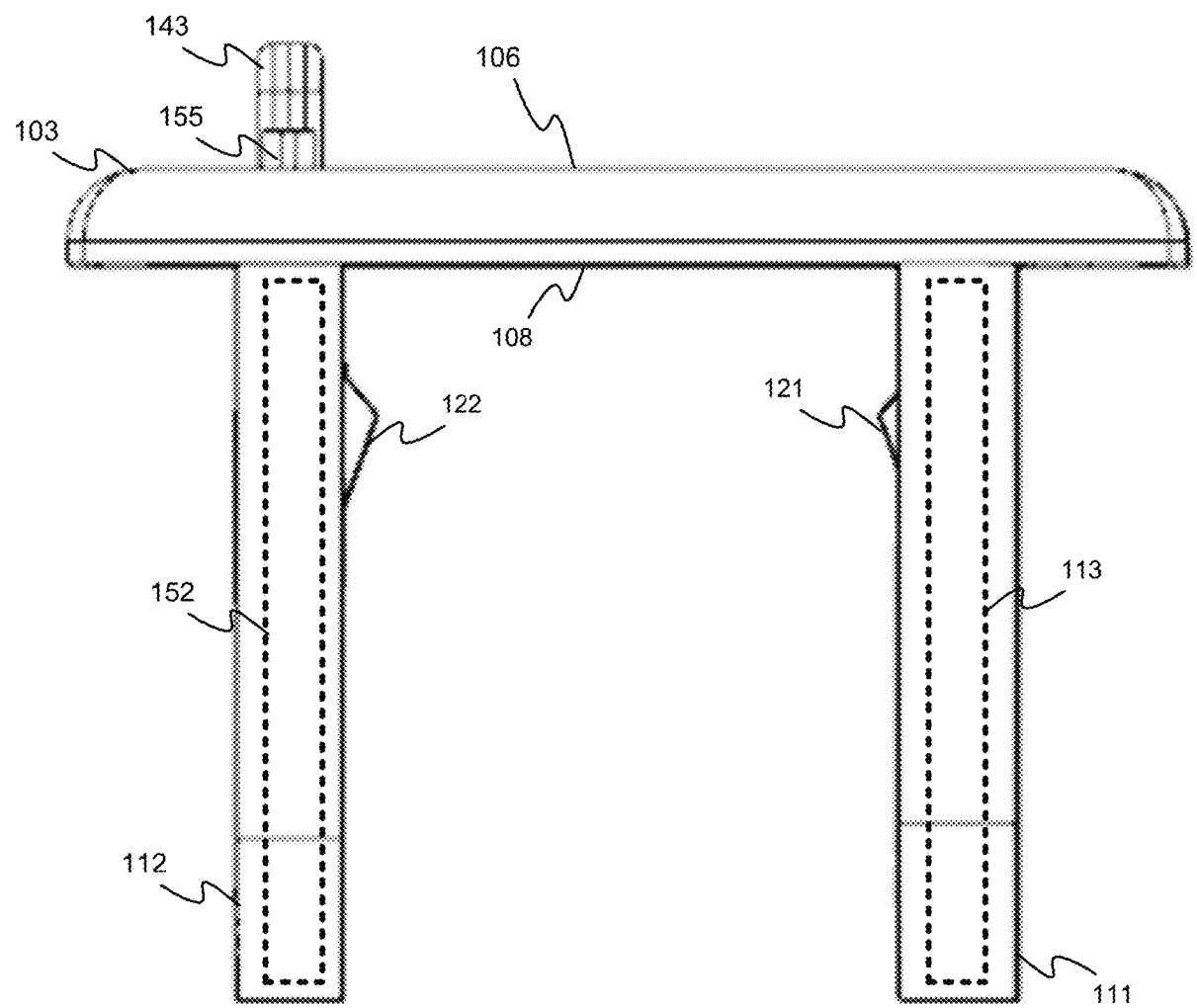
FIG. 5 depicts a bottom view of the device charger, according to non-limiting embodiments.
Figure 6:
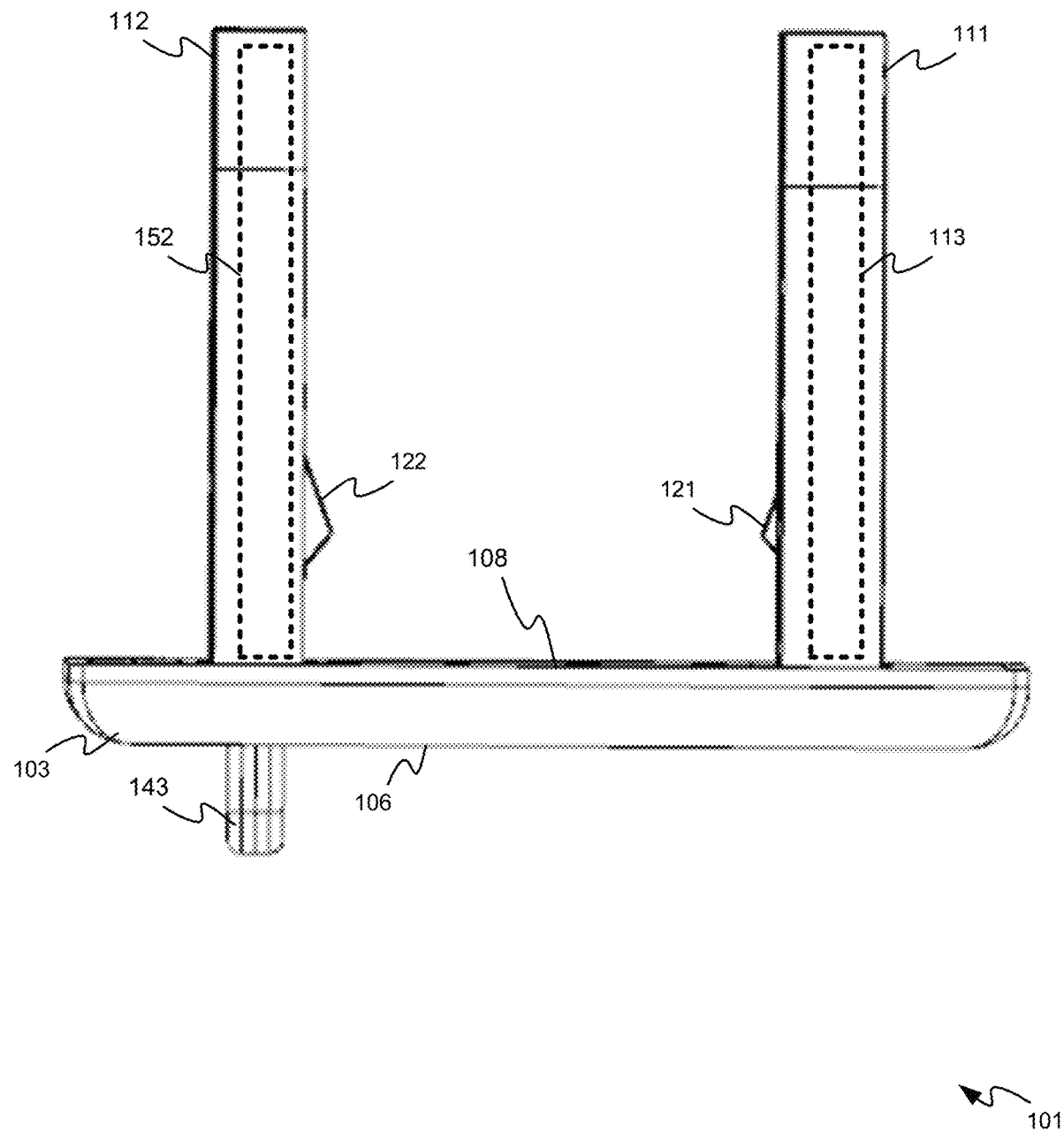
FIG. 6 depicts a top view of the device charger, according to non-limiting embodiments.

As best seen in FIG. 2, FIG. 5 and FIG. 6, the first body 111 and the second body 112 each include respective electrical contacts 121, 122 located to electrically contact one or more respective electrical outlet terminals, the respective electrical contacts 121, 122 configured to provide alternating current from the one or more respective electrical outlet terminals to an AC input of the AC-to-DC power supply 113 at least partially via the electrical circuit of the faceplate 103. Details of the respective electrical contacts 121, 122 will be described below with respect to FIG. 9, FIG. 10A and FIG. 10B.

As best seen in FIG. 1, the device 101 further comprises at least one electrical connector (as depicted four connectors 131, 132, 133, 134), located at the front side 106 of the faceplate 103, connected to a DC output of the AC-to-DC power supply 113, the at least one electrical connector 131, 132, 133, 134 for providing DC power to an external device connected thereto.

In some examples, the at least one electrical connector 131, 132, 133, 134 comprises one or more charging ports; indeed, as depicted, each of the connectors 133, 134 comprise charging ports; for example, the connector 133 comprises a USB (Universal Serial Bus) charging port, and specifically a USB-A charging port, and the electrical connector 133 comprises a USB-C charging port, each of the charging ports connected to a DC output of the power supply 113. While as depicted the charging ports of the connectors 133, 134 each are of different types, in other examples the charging ports of the connectors 133, 134 may be of a same type.

Put another way, as depicted, the one or more charging ports includes a first charging port of a first type and a second charging port of a second type. However, in other examples, the one or more charging ports includes two or more charging ports of a same type. Indeed, when the connectors 133, 134 include charging ports, the charging ports may be of any suitable type including, but not limited to, USB-A, USB-B, USB-C, USB Mini ports, USB Micro ports, and/or charging ports that are not USB-based.

Furthermore, while the connectors 133, 134 are depicted as being oriented parallel to a long axis of the faceplate 103, one or more of the connectors 133, 134 may be oriented perpendicular to the long axis of the faceplate 103 and/or the connectors 133, 134 may be oriented in different directions.

As depicted, the at least one electrical connector also comprises one or more connectors 131, 132 (e.g. male connectors) for connecting to one or more different charging port types at an external device, the one or more connectors 131, 132 attached to a retractable cord 135 (described in more detail below with respect to FIG. 17 and FIG. 21, and as partially seen in FIG. 4) located in the second body 112, the retractable cord 135 connecting the one or more connectors 131, 132 to the DC output via the faceplate 103.

Figure 4:
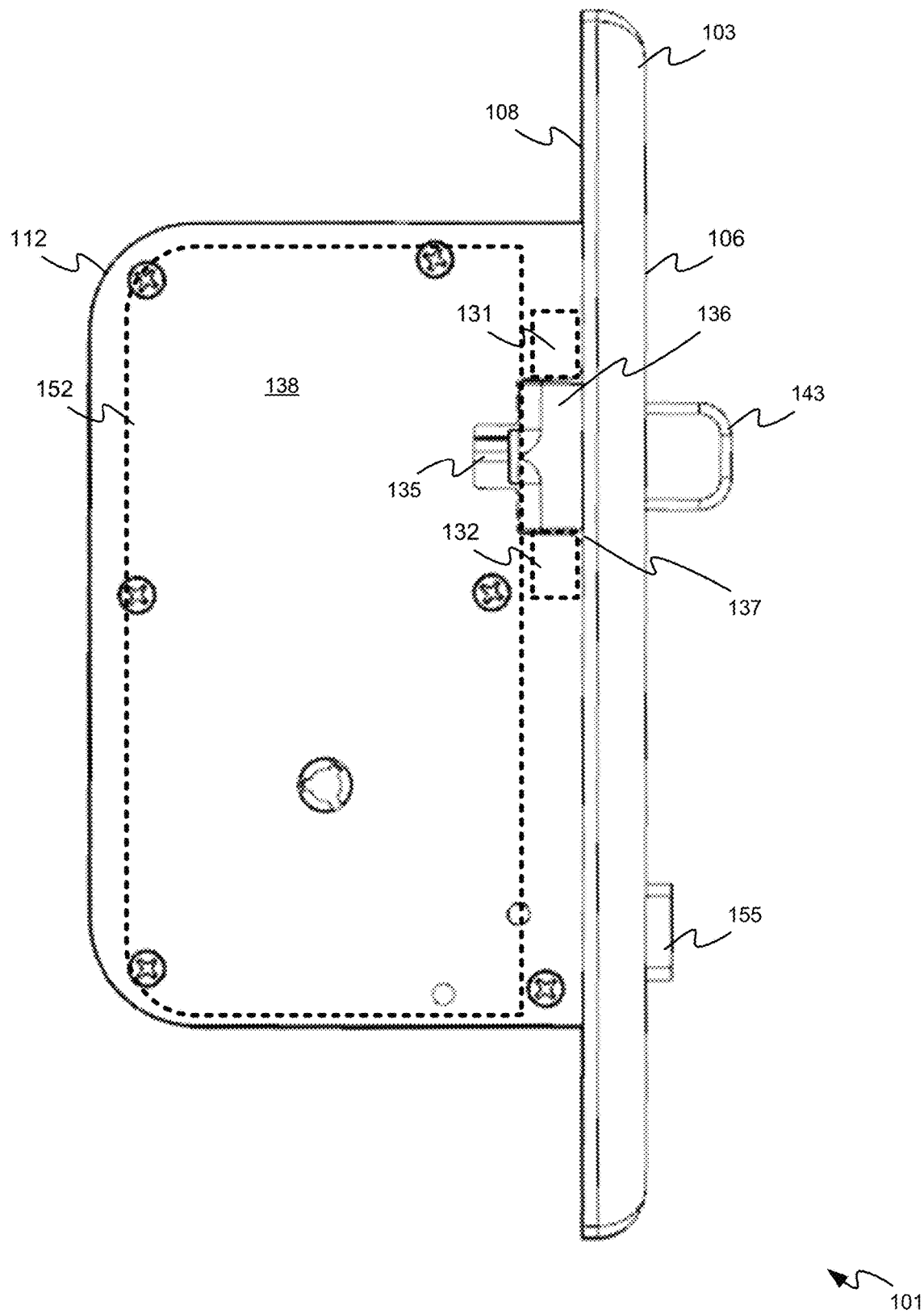
FIG. 4 depicts a left-side view of the device charger, according to non-limiting embodiments.

As depicted, and with further reference to FIG. 4, the connectors 131, 132 extend from a T-shaped connector 136 (described in more detail below with respect to FIG. 21 and FIG. 22) comprising a first connector 131 and a second connector 132 at about 180° to each other. Furthermore, in FIG. 1 and FIG. 4, the connectors 131, 132 are depicted in dashed lines as they are located at a recess 137 (e.g. as best seen in FIG. 4) at the front side 106 of the faceplate 103 (e.g. in which the T-shaped connector 136 resides when the retractable cord 135 is retracted), and covered by a flexible cover 139 on the T-shaped connector 136.

In other examples, however, the connectors 131, 132 extend from a T-shaped connector 136 may not reside in a recess, but may, in a retracted state, be located at the surface of the faceplate 103.

In FIG. 4, the connectors 131, 132 are also depicted in dashed lines as the recess 137 is at least partially covered by a wall 138 of the second body 112. Indeed, in the depicted example, the wall 138 of the second body 112 includes a cutout that shows part of the recess 137. With further reference to FIG. 4, and end of the of the retractable cord 135 is also visible in the recess 137 (e.g. through the cutout).

Indeed, as depicted, and with reference to FIG. 1, the device 101 comprises the flexible cover 139 on the T-shaped connector 136; in general, the flexible cover 139 covers the T-shaped connector 136 when retracted into the recess 137 (e.g. as best seen in FIG. 4), the flexible cover 139 comprising a first flap 141 for covering the first connector 131 and a second flap 142 for covering the second connector 132, the first flap 141 and the second flap 142 each configured to fold about 90° and/or more than 90°, to allow the external device to respectively connect to the first connector 131 or the second connector 132, as described in more detail below with respect to FIG. 23.

As depicted, the flexible cover 139 and/or the T-shaped connector 136 includes a handle 143 which may be grasped (e.g. by a user of the device 101) to extend the T-shaped connector 136, the connectors 131, 132, and the retractable cable from the recess 137 and/or the faceplate 103 to connect one or more of the connectors 131, 132 to one or more external devices, to charge the one or more external devices. Details of such operation are described in more detail below with respect to FIG. 22 and FIG. 23.

As best seen in FIG. 2, FIG. 4, FIG. 5 and FIG. 6, the second body 112 generally comprises a retraction mechanism 152 for extending and retracting the retractable cord 135. In FIG. 2, FIG. 4, FIG. 5 and FIG. 6, the retraction mechanism 152 is depicted in dashed lines to indicate that the retraction mechanism 152 is contained within the second body 112. With reference to FIG. 1, FIG. 3, FIG. 4 and FIG. 6, the device 101 and/or the retraction mechanism 152 further includes a button 155 at the front side 106 of the faceplate 103, the button 155 configured to release the retraction mechanism 152 (e.g. release a ratchet of the retraction mechanism 152) such that, when the retractable cord 135 and/or the T-shaped connector 136 and/or the connectors 131, 132 are retracted, and the button 155 is actuated, the retractable cord 135 is retracted into the second body 112. While any suitable retraction mechanism is within the scope of the present specification, a specific example of the retraction mechanism 152 is described below with respect to FIG. 17, FIG. 18 and FIG. 19. However, in some examples, the retraction mechanism 152 may be at least partially constructed from PCBs, which may also form one or more walls of the second body 112 to provide rigidity to the second body 112, as well as provide electrical communication and/or routing between the power supply 113 and the retractable cord 135 (e.g. and further via the faceplate 103) and/or between the contact 122 and the power supply 113 (e.g. and further via the faceplate 103).

While as depicted, the device 101 includes two connectors 131, 132 of the T-connector 136, the T-connector 136 may be replaced by any suitably shaped connector that includes other numbers of electrical connectors, with, for example, as few as one electrical connectors, or more than two electrical connectors. For example, the T-shaped connector 136 may be replaced with an other-shaped connector that includes three connectors (e.g. similar to the connectors 131, 132) each at about 90° to each other, for example in a cross-shape. However, any type suitable connector of any suitable shape may be used in place of the T-connector 136 which includes any suitable number of connectors similar to the connectors 131, 132, and arranged in a manner so as to not interfere with each other's operation.

In yet further examples, the connectors 131, 132 may be replaceable and/or interchangeable at the T-shaped connector 136 (and/or other-shaped connector). Hence, for example, the connectors 131, 132 may be provided in the form of connector heads, and T-shaped connector 136, and the like, may be adapted to include slots, and the like, into which the connector heads may be inserted for mechanical and electrical attachment to the device 101. Such connector heads maybe sold separate from the device 101 to adapt the device 101 for used with new types of connectors and/or other types of connectors.

As depicted the connectors 131, 132 each comprise a male connector, for example for use with a complementary female charging port of an external device. Furthermore, the first connector 131 and the second connector 132 may be of different types; for example, the first connector 131 may comprise a Lightning™ male connector compatible with Apple™ devices, while the second connector 132 may comprise a USB Type C male connector compatible with Apple™ devices, Android™, and other devices. However, while as depicted the connectors 131, 132 each are of different types, in other examples the connectors 131, 132 may be of a same type and/or be provided as connector heads that may be swapped and/or exchanged at the T-shaped connector 136, and the like. Furthermore, as new electrical connectors types are developed and released, for example by entities that develop electrical connectors for charging and the like, it is understood that such new electrical connectors types may be incorporated into the device 101. Hence, the connectors 131, 132, 133, 134 are understood to be replaceable with any suitable connector type.

Furthermore, while as depicted the device 101 comprises four electrical connectors 131, 132, 133, 134, in other examples the device 101 may comprise as few as one electrical connector, for example one retractable electrical connector (e.g. connected to a retractable cord 135) or one charging port. However, the device 101 may comprise any suitable combination of retractable electrical connectors and/or charging ports, with the components of the power supply 113 adjusted accordingly to provide power to the any suitable combination of retractable electrical connectors and/or charging ports. In yet further examples, the device 101 may include male electrical connectors that are not retractable, for example, as protrusions, and the like, from the faceplate 103.

Use of the device 101 with an electrical outlet in a junction box, and electrical operation of the device 101, is next described.

Figure 7:
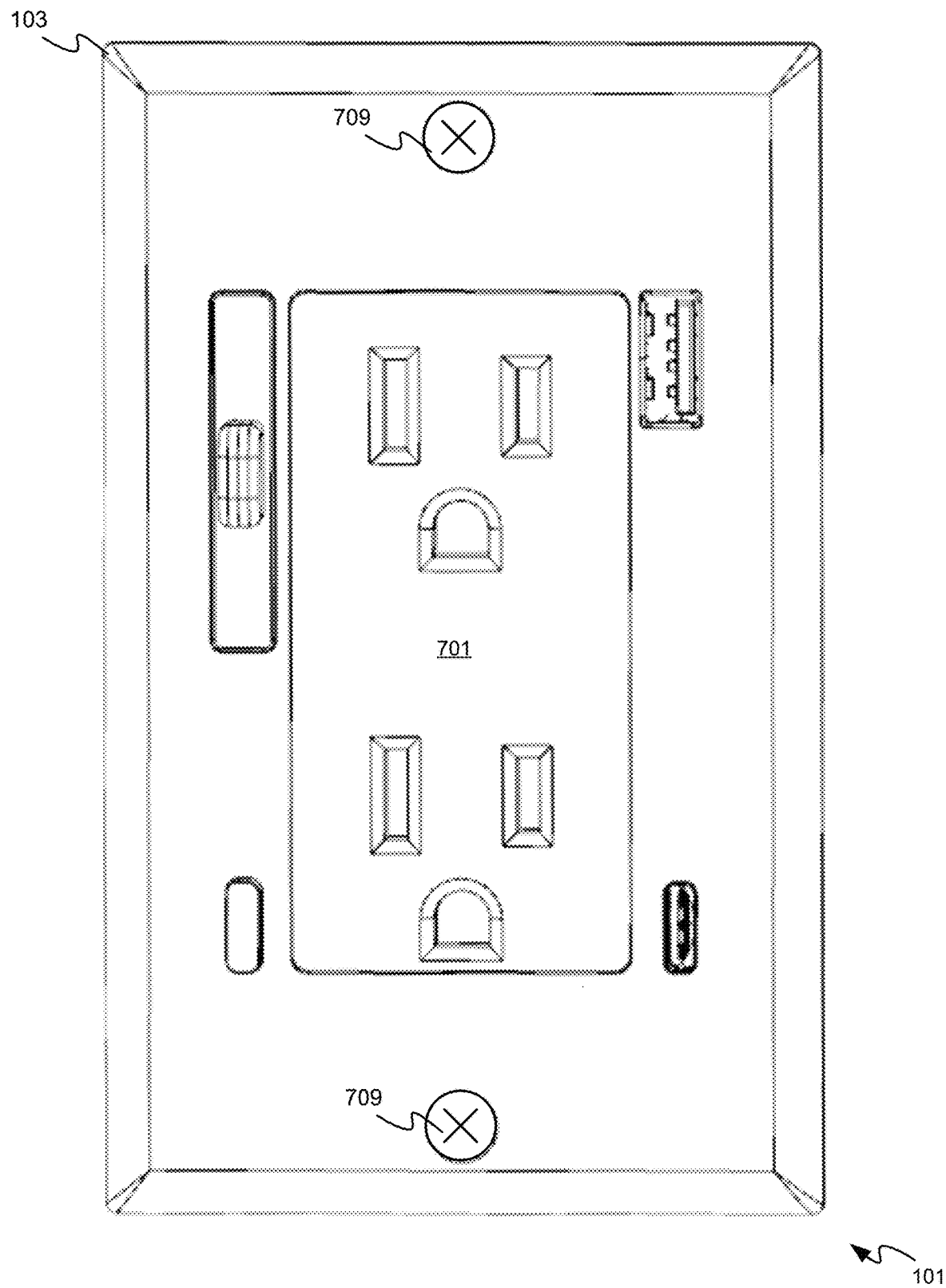
FIG. 7 depicts a front view of the device charger in use with an electrical outlet, according to non-limiting embodiments.
Figure 8:
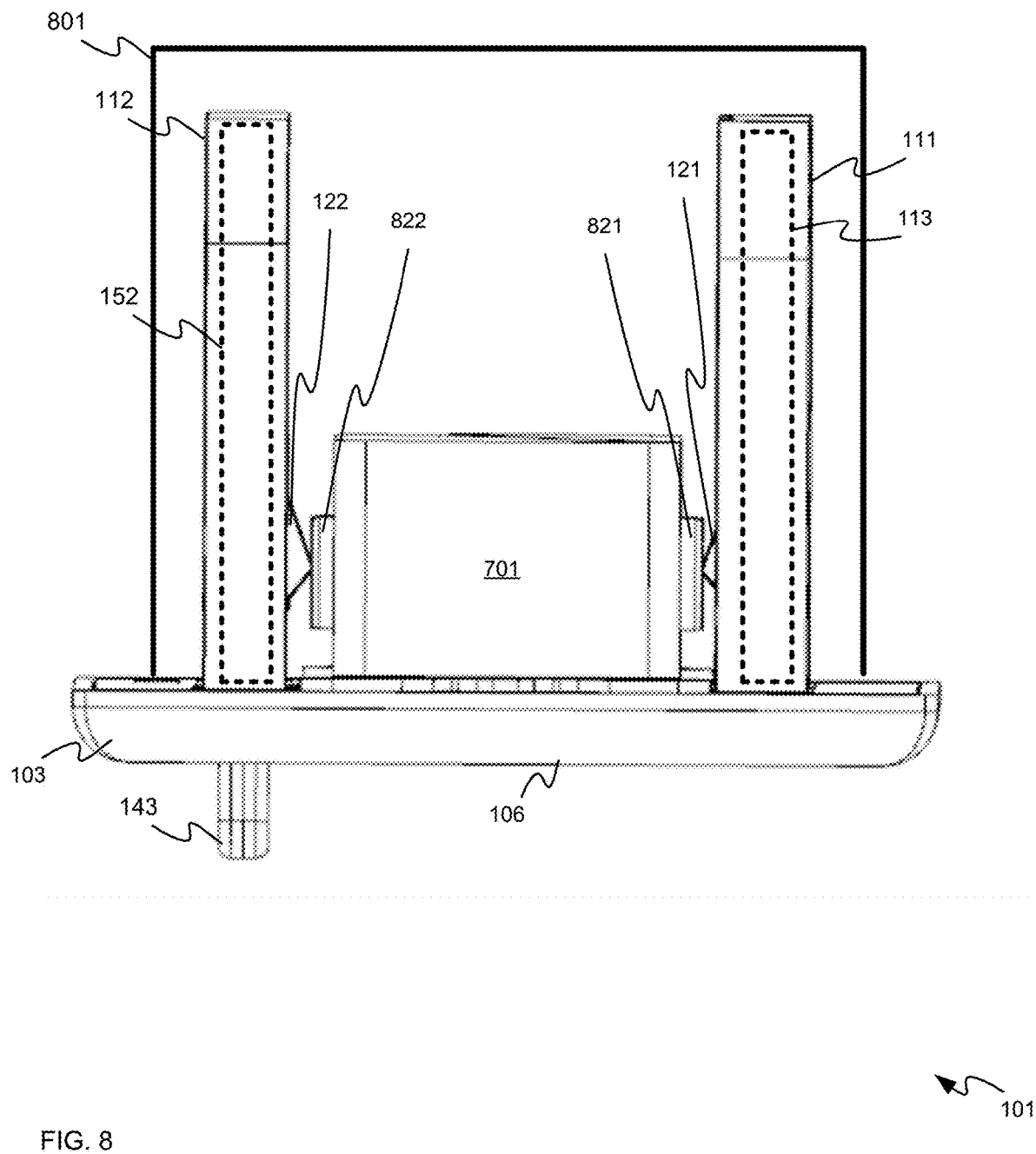
FIG. 8 depicts a top view of the device charger in use with the electrical outlet, according to non-limiting embodiments.

Attention is next directed to FIG. 7 and FIG. 8 which depicts the device 101 in use with an electrical outlet 701 compatible with the aperture 105; for example, as best seen in FIG. 7, fasteners, such as screws 709, have been inserted through the holes 109 to attach the device 101 to the electrical outlet 701 and/or a junction box into which the electrical outlet 701 has been installed. However, in other examples, the device 101 may be adapted to "snap" into a junction box without the used to separately provided fasteners and/or the apertures 105.

In particular, FIG. 7 depicts a front view of the device 101 in use with the electrical outlet 701 and FIG. 8 depicts a top view of the device 101 in use with the electrical outlet 701.

For example, FIG. 7 is similar to FIG. 1, but also shows the electrical outlet 701, and FIG. 8 is similar to FIG. 6, but also shows the electrical outlet 701 and a perimeter of a junction box 801 into which the electrical outlet 701 is installed. While a connection of the electrical outlet 701 to a mains power supply is not depicted, such a connection is nonetheless understood to be present.

With reference to FIG. 7, as depicted the electrical outlet 701 is filling the aperture 105 and/or is at least partially extending through the aperture 105. For example, as depicted, the electrical outlet 701 comprises a duplex electrical outlet with two outlets located on a step and/or ridge of the electrical outlet 701, and a perimeter of the step of the electrical outlet 701 is of a complementary size and shape of the aperture 105, such that the step of the electrical outlet 701 extends into and/or through the aperture 105.

With reference to FIG. 8, the electrical outlet 701 includes terminals 821, 822, which are connected to AC power of the mains power supply. In some examples, each of the terminals 821, 822 may comprise a pair of terminals each pair comprising one or more screw heads (e.g. of one or two respective screws) under which corresponding wires of the mains power supply are attached. However, in other examples, the mains power supply may be attached via slots and/or holes in the rear of the electrical outlet 701. In general, as depicted, the terminals 821, 822 are similar and/or the same as terminals of a standard North American electrical outlet, and are further located in a similar and/or same position as terminals of a standard North American electrical outlet. As such one pair of the terminals 821, 822 may be a "hot" (and/or positive, e.g. in North America, a "black" terminal) while the other pair of the terminals 821, 822 may be "neutral" (and/or negative, e.g. in North America, a "white" terminal).

The terminals 821, 822 are located on opposite sides of the electrical outlet 701. Furthermore, as best seen in FIG. 8, the contacts 121, 122 are of a size, shape and location to contact a respective terminal 821, 822 when the device 101 is inserted into the junction box 801. Furthermore, while the device 101 is depicted in FIG. 7 and FIG. 8 as being inserted into the junction box 801 in a particular orientation, in other examples the device 101 may be inserted into the junction box 801 at 180° and the contacts 121, 122 again contact the terminals 821, 822, for example due to the shape and/or dimensions of the contacts 121, 122, described below.

In particular, each of the terminals 821, 822 is located on a respective side of a respective body 111, 112 adjacent the aperture 105.

For example, as depicted, each of the bodies 111, 112 is of a shape and size to fit between outer sides of the electrical outlet 701 and corresponding sides of the junction box 801, such that the contacts 121, 122 electrically contact and/or touch the respective terminals 821, 822. Each of the bodies 111, 112 may be a shorter depth than the junction box 801, and further may be at an angle to assist with insertion into the junction box 801 and/or fitting between outer sides of the electrical outlet 701 and corresponding sides of the junction box 801, to reduce the likelihood of leading edges of the bodies 111, 112 from catching on the electrical outlet 701 or terminals 821, 822. For example, each of the first body 111 and the second body 112 may each be at about a 2° angle from a normal of the rear side 108 of the faceplate 103, and extending (slightly) away from the electrical outlet-sized aperture 105, such that the inner walls of the bodies 111, 112 (e.g. adjacent the aperture 105) are closer together adjacent the rear side 108 of the faceplate 103 than at ends of the bodies 111, 112 that are furthest from the rear side 108 of the faceplate 103. However, while in a specific examples, each of the first body 111 and the second body 112 may each be at about a 2° angle from a normal of the rear side 108 of the faceplate 103, each of the first body 111 and the second body 112 may each be at any suitable non-zero angle from a normal of the rear side 108 of the faceplate 103, and extending away from the electrical outlet-sized aperture 105. In yet further examples, each of the first body 111 and the second body 112 may not be angled. In yet further examples, each of the first body 111 and the second body 112 may be angled inward towards the aperture 105 to assist the contacts 121, 122 with contacting the terminals 821, 822, for example.

Furthermore, as depicted, the first body 111 and the second body 112 each have rounded corners at an end that that is distal from the faceplate 103, for example to reduce the likelihood of catching on wires, components, and the like that are contained in the junction box 801.

In particular examples, for example, when the device 101 is adapted for North American electrical outlets and junction boxes, each of the bodies 111, 112 may have dimensions of as follows. For example, each of the bodies 111, 112 may be about 75 mm (+/−10 mm) long by about 45 mm (+/−10 mm) wide by about 6.5 mm (+/−2 mm) thick (e.g. when the bodies 111, 112 are not conjoined and as depicted in FIGS. 1 to 6). However, such dimensions are merely an example, and the dimensions of the bodies 111, 112 may be adapted for any suitable electrical outlet and/or junction box, for example for jurisdictions other than North America. Furthermore, when the bodies 111, 112 are at least partially conjoined, the dimensions of the conjoined bodies may be adapted accordingly and may depend on specific types electrical outlets and/or junction boxes for which they may be further adapted. Furthermore, the listed dimensions are understood to be exterior body measurements, and walls of the bodies 111, 112 (which may include the overmold material) may be approx. 0.5 mm (+/−1 mm) thick, such that, for example, a body 111, 112 that is about 6.5 m externally would be about 5.5 mm. internally.

Furthermore, as each of the first body 111 and the second body 112 may be rigid, as described above, such rigidity may assist the contacts 121, 122 with electrical interaction with and/or contact with the terminals 821, 822. For example, as depicted in FIG. 8, the contacts 121, 122 may comprise at least one spring contact in at least a partially triangular shape and/or at least partially curved shape, and the rigidity of the bodies 111, 112 may provide a rigid base for the spring action of the contacts 121, 122. Furthermore, each of the contacts 121, 122 comprise an electrically conducting material that also may form a spring contact, such as aluminum, copper, gold, conductive gel, impregnated conductive plastic, any suitable combination thereof, and the like.

Figure 9:
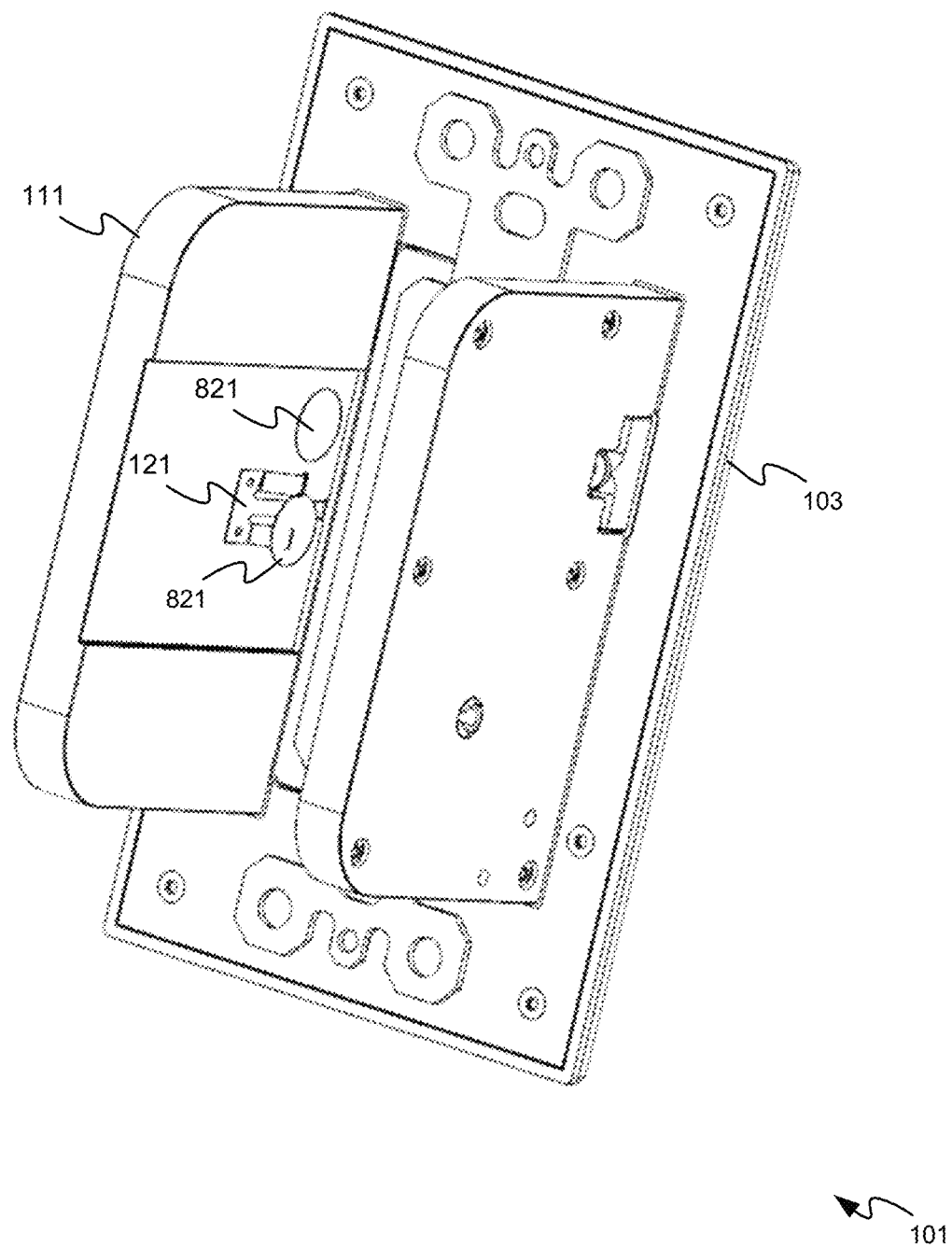
FIG. 9 depicts a perspective view of the device charger in use with the electrical outlet with a portion of the electrical outlet removed to show interaction between an electrical contact of the device charger and an alternating current terminal of the electrical outlet, according to non-limiting embodiments.
Figure 10A:
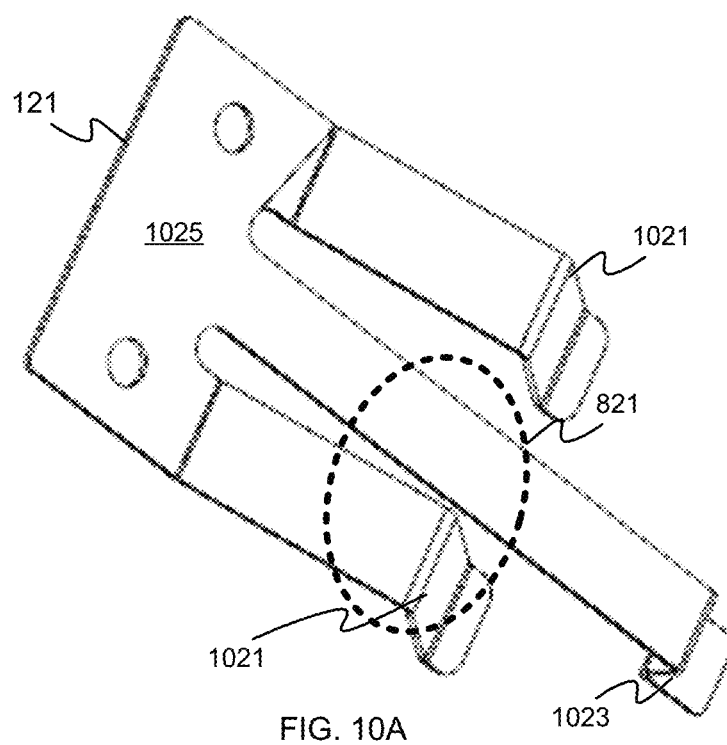
FIG. 10A depicts a perspective view of the electrical contact of the device charger and the alternating current terminal of the electrical outlet, according to non-limiting embodiments.
Figure 10B:
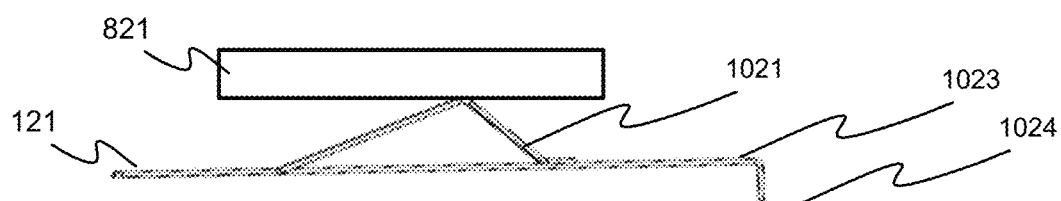
FIG. 10B depicts a side view of the electrical contact of the device charger and the alternating current terminal of the electrical outlet, according to non-limiting embodiments.

Attention is further directed to FIG. 9, FIG. 10A and FIG. 10B which show details of the contact 121 and the terminals 821.

For example, FIG. 9 depicts a perspective view of the contact 121 at the device 101 and a location of the terminals 821; in other words, in FIG. 9, a body of the electrical outlet 701 is removed to schematically show the location of the terminals 821 relative to the contact 121, the terminals 821 comprising a pair of terminals, as described above. As depicted, the contact 121 is contacting one of the terminals 821.

FIG. 10A depicts a perspective view of the contact 121 that is similar to that depicted in FIG. 9, but with the remainder of the device 101 removed; FIG. 10A further shows a location of the contacted terminal 821 in dashed lines. FIG. 10B depicts a side view of the contact 121 in contact with one of the terminals 821.

With reference to FIG. 10A and FIG. 10B, the contact 121 comprises two triangular shaped spring contacts 1021, at least one of which contacts one of the terminals 821 when the device 101 is inserted into the junction box 801. The contact 121 further comprises an optional central prong 1023 between the spring contacts 1021, and connected thereto via a base 1025, the base 1025 for attaching the contact to a wall of the first body 111 adjacent the aperture 105 (e.g. via apertures therethrough and the like). At least one of the spring contacts 1021 hence contacts a terminal 821 and conveys AC power to the prong 1023 which is electrically connected to an AC input of the power supply 113 (e.g. via the electrical circuit of the faceplate 103); for example, as best seen in FIG. 10B, the central prong 1023 may include a step 1024 which connects to the electrical routing to the AC input of the power supply 113 (e.g. see FIG. 11, described below). Indeed, in some examples, with reference to FIG. 9, the central prong 1023 may penetrate a respective body 111, 112 and about 1 mm to about 2.0 mm of the central prong 1023 is not exposed such that the central prong 1023 does not contact the faceplate 103 and/or the front-facing edge of the respective body 111, 112 (e.g. to meet North American electrical standards, and the like). However, the central prong 1023 may be optional and/or adapted to any suitable shape and/or removed, and/or the contact 121 may be include any suitable shape that conveys AC power to an AC input of the power supply 113 via the electrical circuit of the faceplate 103. Furthermore, one of the contacts 121, 122 may include the central prong 1023 and the other of the contacts 121, 122 may not include the central prong 1023 and/or have a central prong that is reduced in length.

Figure 10C:
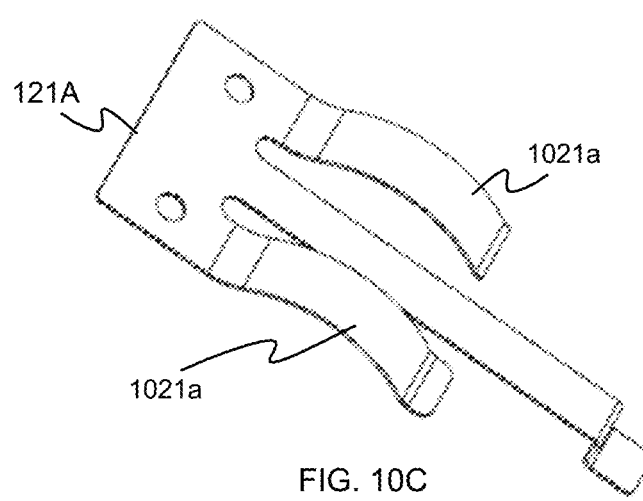
FIG. 10C depicts a perspective view of an alternative electrical contact of the device charger, according to non-limiting embodiments.

Furthermore, the spring contacts 1021 may be of any suitable shape that are not triangular. For example, attention is directed to FIG. 10C which depicts an alternative contact 121a that maybe used in place of the contact 121. The contact 121a is similar in shape to the contact 121, but includes curved spring contacts 1021a in place of the triangular shaped spring contacts 1021.

The contact 122 is similar to the contact 121 (and/or the contact 121a), but located at the second body 112 and located to contact one or more of the terminals 822. Hence, the contacts 122 convey AC power to an AC input of the power supply 113, at least partially via the faceplate 103.

With reference to FIG. 9 and FIG. 10A, it is understood each of the contacts 121, 122 are centered on a long axis (e.g. length-wise) of a respective body 111, 112, the bodies 111, 112, are generally centered length-wise on the faceplate 103. However, as depicted, the terminals 821, 822 are generally not centered with respect to their position in the junction box 801 and/or with respect to the contacts 121, 122 (e.g. which is common in North American electrical outlets; however, the terminals 821, 822 may alternatively be centered with respect to their position in the junction box 801 and/or with respect to the contacts 121, 122).

In some examples, the contacts 121, 122 may be about 9 mm wide (e.g. from outside edges of the spring contacts 1021) and the spring contacts 1021 may be separated by about 4 mm (e.g. the spring contacts 1021 may be about 2.5 mm wide). The contacts 121, 122 may be about 20 mm long, for example, from an edge of the base 1025 opposite the spring contacts 1021 (and/or the central prong 1023), to an end of the central prong 1023 that does not include the step 1024. In some of these examples, the spring contacts 1021 may be about 2 mm to about 3 mm high. In a particular implementation, each of the contacts 121, 122 may be centered on a long axis of aperture-facing wall of a respective body 111, 112, with a respective center of each of the contacts 121, 122 may be about 37.5 mm (+/−5 mm) from each outer edge of a respective body 111, 112 (e.g. an edge of a body 111, 112 extending from the faceplate 103 that is furthest from the faceplate 103). The center prong 1023 (e.g. when present) may terminates about 1.0 mm to about 2.0 mm before a front-facing edge of a respective body 111, 112 (e.g. adjacent the aperture 105) such that the central prong 1023 does not contact the faceplate 103 and/or the front-facing edge of the respective body 111, 112. Such dimensions may assist with the contacts 121, 122 contacting the terminals 821, 822 regardless of the orientation of the device 101 with respect to the junction box 801. However, other shapes and/or dimensions of the contacts 121, 122 are within the scope of the present specification.

Attention is next directed to FIG. 11 which depicts a schematic electrical diagram of the device 101. Electrical routing and/or connections and/or wiring between the electrical components of the device 101 are depicted in FIG. 11 in lines of a larger width as compared to lines showing schematic locations of the components.

In particular FIG. 11 depicts: the contacts 121, 122, the power supply 113, an AC input 1101 of the power supply 113, a DC output 1102 of the power supply, an electrical circuit 1103 of the faceplate 103. As depicted, the electrical circuit 1103 includes a controller 1105, and electrical routing and/or connections between the contacts 121, 122 and the AC input 1101, as well as between the controller 1105 and the connectors 131, 132, 133, 134, and between the controller 1105 and the retractable cord 135 located in the retraction mechanism 152. The controller 1105 may include any suitable processing and/or control components of the device 101 as described hereafter.

As depicted, the electrical circuit 1103 comprises: electrical routing to provide AC power from the respective electrical contacts 121, 122 to the AC input 1101; electrical routing from the DC output 1102 to the retractable cord 135 (e.g. as depicted, via the controller 1105); electrical routing from the DC output 1102 to the connectors 133, 134 (e.g. as depicted, via the controller 1105). As depicted, the electrical routing from the DC output 1102 to the retractable cord 135 and the connectors 133, 134 is also via the controller 1105, and the controller 1105 comprises components for providing additional functionality to the device 101, as described hereafter.

Furthermore, while the electrical routing from the DC output 1102 and the electrical routing to the connectors 131, 132, 133, 134 are depicted as single lines, it is understood that the DC output 1102 is provided in a pair of electrical connections (e.g. for "high" and a "low" electrical output and the like).

For example, as depicted, the electrical circuit 1103 further comprises, for example as a component of the controller 1105, at least one microcontroller unit (MCU) 1115 configured for one or more of: internal device monitoring (e.g. to monitor, for example, current, voltage, power, temperature and the like; hence the MCU 1115 may include a temperature sensor, and/or the MCU 1115 may be in communication with a temperature sensor in the faceplate 103 and/or located at the power supply 113); internal and external power amplitude monitoring and modulation; internal power switching; and internal device control. In other words, the controller 1105 and/or the MCU 1115 generally executes instructions and/or one or more applications (e.g. as stored in a memory, not depicted, and/or as or received via an antenna 1123, described below) which implements given functionality of the device 101. While only one MCU 1115 is depicted, the electrical circuit 1103 the MCU 1115, may include more than one microcontroller units.

In some examples, the MCU 1115 may be further configured to communicate with external devices connected to the connectors 131, 132, 133, 134; as such the electrical routing between the controller 1105 and the connectors 131, 132, 133 134, and/or the connectors 131, 132, 133 134, may be further configured for two-way data communication between the MCU 1115 and external devices, such that, for example, the MCU 1115 may query such external devices for data that may include, but is not limited to a, battery charging state of such external devices; in these examples, the MCU 1115 may be in communication with power supply 113 and/or a power control circuit of the controller 1105, to control charging of the external devices accordingly, (e.g. by controlling power output to the external devices). In such examples, the MCU 1115 may further query an external device to determine a type thereof, which may be used to determine power output characteristics to be used to charge the external device.

For example, the controller 11105 may further comprise, as depicted, a routing circuit 1117 configured to prevent power from the DC output 1102 from being routed to at least one electrical connector 131, 132, 133, 134 when no respective external device is connected thereto, such that, when a single external device is connected to a single electrical connector 131, 132, 133, 134 (e.g. and no additional external devices are connected to other electrical connectors), the power from the DC output 1102 is routed to the single electrical connector 131, 132, 133, 134 only. The routing circuit 1117 may be controlled by the MCU 1115 and/or the routing circuit 1117 may comprise any suitable combination of detectors and/or switches and the like for routing power to one or more of the electrical connectors 131, 132, 133, 134.

While electrical connections between the components of the controller 1105 are not depicted, such electrical connections are nonetheless understood to be present to route power to the electrical connectors 131, 132, 133, 134.

As depicted, the electrical circuit 1103 further comprises a wireless local area network wireless antenna 1123 to provide one or more of: external connectivity, external monitoring, external control and external programming to the device 101. For example, instructions maintained at the device 101 (e.g. as stored at a memory of the controller 1105) may be updated via the antenna 1123, and/or the antenna 1123 may be used to transmit parameters of the device 101 to a wireless network, for example to indicate whether an external device is connected to the device 101 and the like. The antenna 1123 may hence further enable the device 101 as an internet-of-things (IoT) device such that the device 101 may be controlled and/or monitored by an external IoT system and/or device. While not depicted, it is further understood that, when the antenna 1123 is present the electrical circuit 1103 further comprises one or more communication units and/or transceivers to implement radio functionality of the device 101. The antenna 1123, and associated communication units, may comprise one or more of a WiFi antenna/communication unit, a Bluetooth™ antenna/communication unit, a near-field communication (NFC) antenna/communication unit and the like, and/or any other suitable antenna/communication unit.

FIG. 11 further schematically depicts an electrical circuit 1124 in communication with each of the first connector 131 and the second connector 132. The electrical circuit 1124 may be integrated into the T-shaped connector 136 of the connectors 131, 132 and is configured to: detect when a first external device is connected to the first connector 131; and detect when a second external device is connected to the second connector 132. The electrical circuit 1124 may hence be configured communicate such information to the MCU 1115 and/or the routing circuit 1117 such that the routing circuit 1117 may route power accordingly. Hence, the electrical circuit 1124 may be in communication with the MCU 1115 via the retractable cable 135.

In some examples, the electrical circuit 1124 may include similar functionality as the routing circuit 1117 and may be configured to prevent power from being routed to at least one electrical connector 131, 132 when no respective external device is connected thereto, such that, when a single external device is connected to a single electrical connector 131, 132 and no additional external devices are connected to other electrical connectors, the power is routed to the single electrical connector 131, 132 only, or otherwise as instructed or routed by the MCU 1115 and/or the controller 1105.

Attention is next directed to FIG. 12 which is substantially similar to FIG. 11, with like components having like numbers; however, FIG. 12 depicts an alternative implementation of the device 101 in which the retraction mechanism 152, the retractable cord 135 and the connectors 131, 132 (e.g. as well as the T-shaped connector 136 and circuit 1124) is replaced by a battery 1201, for example located in the second body 112. In these examples the battery 1201 may be used to store power produced by the power supply 113 and/or provide power to external devices as an alternate power source to the power supply 113. For example, during a power blackout and/or when the mains power supply is at least temporarily not working, the battery 1201 may provide power to the device 101 and/or one or more external devices via the connectors 133, 134. However, the battery 1201 may also be used to transmit DC power to one or more of the connectors 131, 132, 133, 134 at a same rate and/or a similar rate and/or a higher rate (e.g. as compared to the power supply 113), for example for short periods of time to boost an amount of charge amount delivered to an external device. In some examples, the MCU 1115 may control the device 101 (e.g. as depicted in FIG. 12) to charge the battery 1201 during off-peak electricity rate times and discharge (e.g. to an external device) during peak electricity rate times. The battery 1201 may include, but is not limited to, a lithium ion battery, a lithium polymer battery, solid state battery, and/or any other suitable battery type.

As such, the device 101 and/or the controller 1105 is modified, as compared to FIG. 11, to include: electrical routing from the DC output 1102 to the battery 1201 (e.g. via the controller 1105). Indeed, the device 101 as depicted in FIG. 12 includes electrical routing to the battery 1201 to charge the battery 1201, and electrical routing from the battery 1201 to draw power therefrom; in some examples the charging and power supply electrical routing may be at least partially combined.

The device 101 and/or the controller 1105 depicted in FIG. 12 is further modified, as compared to FIG. 11, to include: a load monitor 1217 for at least one electrical connector 133, 134 to firstly provide power to the at least one electrical connector 133, 134 from onboard battery power storage (e.g. from the battery 1201) and secondly provide the power to the at least one electrical connector 131, 132 from the AC-to-DC power supply 113. In these examples, the load monitor 1217 hence causes power to be initially provided to an external device from the battery 1201 and, when the battery 1201 drops below a given charge level, the load monitor 1217 may causes power to be provided to the external device from the power supply 113. For example, the load monitor 1217 and the MCU 1115 are generally configured to communicate with each other, and the MCU 1115 may instruct the load monitor 1217 whether to route power to the connectors 131, 132, 133, 134 from the battery 1201 or the power supply 113. In particular, the load monitor 1217 monitors load on the connectors 131, 132, 133, 134 and instructs and/or signals the MCU 1115 accordingly.

Indeed, the device 101 and/or the controller 1105 is further modified, as compared to FIG. 11, to include: a DC-to-DC booster circuit 1218 to maintain output voltage to the electrical connectors 131, 132, 133, 134 when an external device is initially connected thereto. For example, when an external device is initially connected to an electrical connector 131, 132, 133, 134, and the being charged via the battery 1201, a drop in voltage may initially occur; the booster circuit 1218 generally prevents such a drop in voltage from occurring, and may be powered by DC power from the DC output 1102 to boost the power output to a connector 131, 132, 133, 134. When the DC power from the DC output 1102 is 5V, the DC-to-DC booster circuit 1218 may comprise a 5V booster circuit. For example, voltage of power from the battery 1201 may be DC and in a range of 4.2-5V, with 4.2 V being provided when the battery 12012 comprises a lithium battery; when load is placed on a lithium battery, the voltage can drop to the 3V range, and the DC-to-DC booster circuit 1218 may hence boost the voltage accordingly to 5V.

Indeed, the device 101 and/or the controller 1105 is further modified, as compared to FIG. 11, to include: a battery monitor and charger 1219, and the MCU 1115 may be further configured to monitor and charge the onboard battery power storage (e.g. the battery 1201), for example by communicating with the battery monitor and charger 1219, when the MCU 1115 determines available power storage capacity within the battery 1201. Hence the battery monitor and charger 1219 may be used to monitor the battery 1201 and/or charge the battery 1201.

Figure 13A:
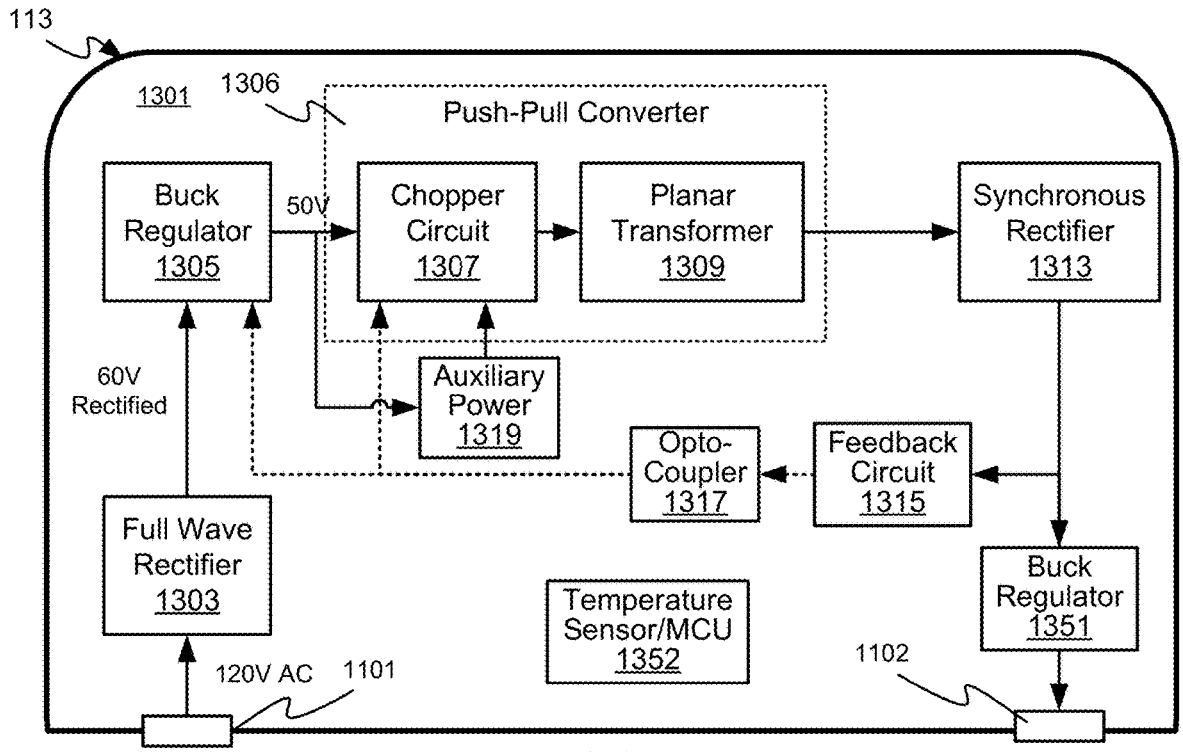
FIG. 13A depicts a schematic of a power supply that may be used with the device charger of FIG. 1, according to non-limiting embodiments.

Attention is next directed to FIG. 13A which depicts an example implementation of the power supply 113. In particular, it can be challenging to provide an AC-to-DC power supply in a small package, for example, that can fit into the dimensions of the first body 111 and provide power to the four connectors 131, 132, 133, 134, for example when four external devices are respectively connected thereto, and further minimize power loss and/or dissipate heat (e.g. heat is a by-product of power loss) effectively when the device 101 is installed in the junction box 801. The depicted combination of components of the power supply 113 depicted in FIG. 13A may address each of these issues.

As depicted, the components of the power supply 113 depicted in FIG. 13A are mounted on, and/or attached to, and/or laid out on a PCB 1301 which, as depicted is shaped similar to the first body 111, for example with rounded corners corresponding to the rounded corners of the first body 111 depicted in FIG. 3. The PCB 1301 may further provide electrical connections between the components of the power supply 113 Furthermore, the components of the power supply 113 are depicted in FIG. 13A to show their relative position on the PCB 1301. In other examples, however, the components of the power supply 113 may be positioned and/or packaged in any suitable manner (e.g. on a PCB).

Specifically, the components of the power supply 113 depicted in FIG. 13A comprise a full wave rectifier 1303 electrically connected to the AC input 1101, which is connected to the contacts 121, 122 as described above with respect to FIG. 11 and FIG. 12. The full wave rectifier 1303 generally rectifies the AC power received from the AC input 1101.

The power supply 113 further comprises a buck regulator 1305 in communication with the full wave rectifier 1303 to step down rectified AC voltage from the full wave rectifier 1303 to a lower voltage. For example, when the AC power received at the AC input 1101 is about 120V, the rectified AC voltage is about 60V, and the buck regulator 1305 may step down the rectified AC voltage to about 50 V, as depicted. However, the power supply 113 may be adapted for use with 210V-240V AC power and/or any other suitable voltage range.

The power supply 113 further comprises a push-pull converter 1306 which, as depicted, comprises: a chopper circuit 1307 in communication with the buck regulator 1305 to control a duty cycle of the lower voltage rectified AC voltage; and a planar transformer 1309 in communication with the chopper circuit 1307 to further reduce voltage of the lower voltage rectified AC voltage. Further details of the chopper circuit 1307 and the planar transformer 1309 (interchangeably referred to hereafter as the transformer 1309) are described below. However, the output from the push-pull converter 1306 generally comprises low voltage square pulses that are at a desired output voltage of the power supply 113. Indeed, the output from the planar transformer 1309 may be 5V (e.g. at 200-300 mA).

The power supply 113 further comprises a rectifier 1313 in communication with the planar transformer 1309 to convert electrical output of the planar transformer 1309 to direct current voltage. In general, the DC output 1102 of the AC-to-DC power supply 113 comprises an output of the rectifier 1313. As depicted, the rectifier 1313 comprises a synchronous rectifier, as synchronous rectifiers are switch-based and tend to generate less heat than a diode-based rectifier. The DC output 1102 of the AC-to-DC power supply 113 may output voltages compatible with standards associated with the connectors 131, 132, 133, 134, for example DC voltage of about 5V at up to about 10 A current and/or any suitable combination of voltage and/or current. However, in a successful prototype the power supply 113 as depicted provided power at about 5V at a current greater than about 4 A at the DC output 1102.

As depicted, the power supply 113 further comprises a feedback circuit 1315 between the DC output 1102 (and/or an output of the rectifier 1313) and the buck regulator 1305, to control the direct current voltage output from the rectifier 1313 by controlling the lower voltage output of the buck regulator 1305. The feedback circuit 1315 may include one or more MCUs which may be in communication with the MCU 1115. For example, the feedback circuit 1315 is generally configured to monitor the direct current voltage output from the rectifier 1313 and adjust the output of the buck regulator 1305 to raise or lower the direct current voltage output from the rectifier 1313 (e.g. to maintain the output of the direct current voltage output from the rectifier 1313 within a given voltage range). In some examples, feedback circuit 1315 generally comprises a negative feedback loop which (to ensure no oscillation) works by controlling the duty cycle of the output of the buck regulator 1305 (e.g. output voltage and/or current). For example, by increasing the duty cycle of the buck regulator 1305, the feedback circuit 1315 lowers the current or increases the voltage, and vice versa. In some examples, the feedback circuit 1315 may include an error amplifier which may measure and/or determine a difference between a reference value and output value and alters the buck current or voltage accordingly.

Alternatively, and/or in addition to controlling a duty cycle of the buck regulator 1305, the buck regulator 1305 may comprise one or more variable electrical components (e.g. resistors and/or capacitors and/or inductors, and the like), and the feedback circuit 1315 may control parameters of such variable electrical components to control the output of the buck regulator 1305.

The feedback circuit 1315 may comprise a processor and/or a microcontroller unit, and the like, configured to implement such functionality, and a device for measuring DC power and/or DC voltage output by the rectifier 1313.

As depicted, the power supply 113 further comprises an optocoupler 1317 and/or an opto-isolator between the feedback circuit 1315 and the buck regulator 1305 to maintain isolation between the AC power from the DC power in the power supply 113.

As depicted, the feedback circuit 1315 is optionally and/or alternatively configured to control the chopper circuit 1307, for example to control a duty cycle and/or frequency of the chopper circuit 1307 to control the direct current voltage output from the rectifier 1313. Hence, for example, when load on the DC output 1102 increases (which may be measured as a drop in DC voltage and/or DC power by the feedback circuit 1315), the feedback circuit 1315 may decrease the duty cycle of chopper circuit to increase power output of the device 101. Feedback control routing of the power supply 113 are depicted in dashed lines to distinguish from power routing depicted in solid lines.

As depicted, the power supply further comprises an auxiliary low voltage power supply 1319 configured to power the chopper circuit 1307. For example, as depicted, the auxiliary low voltage power supply 1319 may be powered by the output of the buck regulator 1305.

Alternatively, and/or in addition to the auxiliary low voltage power supply 1319 configured to power the chopper circuit 1307, an auxiliary coil at the planar transformer 1309 may be used to at least partially power the chopper circuit 1307.

As mentioned previously, components of the AC-to-DC power supply 113 are laid out on the PCB 1301. In order to fit the components into the first body 111, which may have an external thickness of about 5 mm to about 8.5 mm, when respective components of the power supply 113 are one or more of greater than a PCB thickness (e.g. of the PCB 1301), non-surface-mountable, and exceed a given maximum height above the PCB 1301, the respective components may be located in cutouts of the PCB 1301. Indeed, locating such components in cutouts may to assist accommodate taller (e.g. greater than the PCB 1301 thickness) electrical components in the power supply 113 while minimizing power loss to less than 20% (e.g. in a successful prototype) in the power supply 113 and/or assist with heat dissipation in the power supply 113. For example, at least the planar transformer 1309 may be located in such a cutout.

In general, planar transformers may be used with lower voltage DC power. Adapting the planar transformer 1309 of the power supply for use with AC power may be achieved by using the buck regulator 1305 and the chopper circuit 1307 to step down the AC power input into the power supply 113 (e.g. using the buck regulator 1305) and chopping the rectified AC power of the buck regulator 1305 into pulses (e.g. using the chopper circuit 1307).

In some examples, the power supply 113 may be adapted to include a secondary buck regulator 1351, for example between rectifier 1313 and the DC output 1102 (and after the feedback circuit 1315 such that the feedback circuit 1315 measured the output of the rectifier 1313 and/or the input to the secondary buck regulator). Such a secondary buck regulator 1351 may regulate and/or control of the DC output voltage and current from the push-pull converter 1306 to the DC output 1102 via the rectifier 1313 to improve and/or regulate transient responses, and the like.

In general, the power supply 113 comprises a voltage-fed buck (regulator) plus push-pull (converter) topology; as such, while not depicted, the buck regulator 1305 includes an output capacitor. However, the power supply 113 maybe adapted to a current-fed buck plus push-pull topology in which a respective buck regulator does not include an output capacitor which may render the current-fed buck plus push-pull topology more compact than the voltage-fed buck plus push-pull topology. Furthermore, in the current-fed buck plus push-pull topology, the buck regulator (e.g. similar to the buck regulator 1305) drives a respective push-pull converter (e.g. similar to the push-pull converter 1306) with a current sources, which may result in reduced stress on transistors and/or MOSFETs (metal-oxide-semiconductor field-effect transistors) of the components of the power supply over an operating range, as compared to the voltage-fed buck plus push-pull topology.

As depicted, the power supply 113 (e.g. as depicted in FIG. 13A) may include one or more temperature sensors 1352 (e.g. one or more thermistors) in communication with the MCU 1115, for example via suitable connections between the power supply 113 (and/or the body 111) and the faceplate 103; in these examples, the MCU 1115 receives temperature readings from the one or more temperature sensors 1352 to monitor the temperature of the power supply 113, for example, for internal device monitoring. When the one or more temperatures sensors 1352 include a plurality of temperature sensors and/or reading locations, the MCU 1115 may receive a plurality of temperature readings and determine a temperature gradient map of the power supply 11 (e.g. the locations of the the plurality of the temperature sensor at the power supply 113 may be preconfigured at the MCU 1115 and/or a memory which with the MCU 1115 is in communication). In these examples, the MCU 1115 may be in communication with feedback circuit 1315 (e.g. via suitable connections) and signal the feedback circuit 1315 to control the buck regulator 1305 and/or the chopper circuit 1307 to reduce power generated by the power supply 113, for example when the temperature of the power supply 113 (and/or a temperature of the temperature gradient map) exceeds a threshold temperature. In some of these examples, 1115 the MCU may alternatively control routing of reduced power to any external devices connected to the connectors 131, 132, 133, 134, for example to distribute power thereto on a priority basis (e.g. based on a charging state of respective batteries and the like, and/or any other suitable parameter).

In some of these examples, as depicted, the power supply 113 may include at least one MCU (e.g. an optional "MCU" as indicated at the "Temperature Sensor/MCU 1352) which may also measure temperature (and/or a temperature gradient map) of the power supply 13 via the one or more temperature sensors and control the feedback circuit 1315 accordingly to reduce power to in turn reduce temperature, as described above with respect to the MCU 1115 (e.g. such an MCU of the power supply 113 may be in communication with feedback circuit 1315, and power reduction may be based on a threshold temperature). When both the MCU 1115 and an MCU of the power supply 113 are in communication with the feedback circuit 1315, one of the MCU 1115 and the MCU of the power supply 113 may have priority and control the feedback circuit 1315 accordingly, and/or the MCU 1115 and the MCU of the power supply 113 may operate in tandem.

Figure 13B:
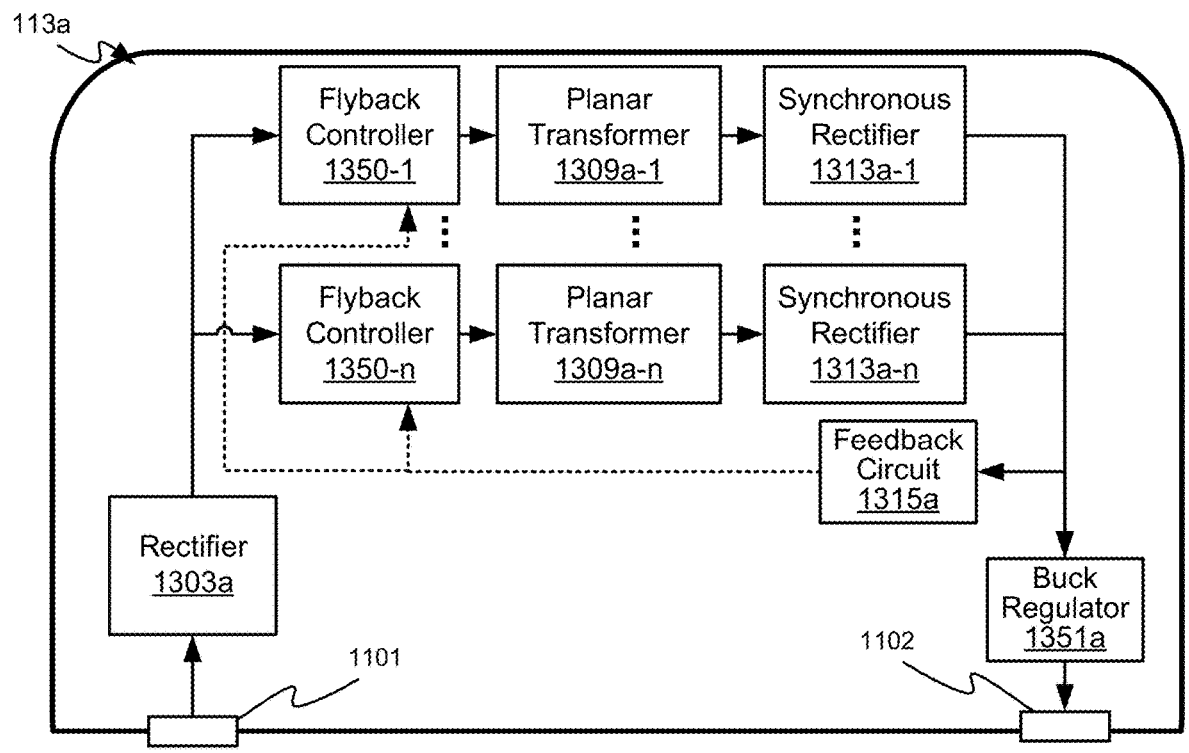
FIG. 13B depicts a schematic of an alternative power supply that may be used with the device charger of FIG. 1, according to non-limiting embodiments.

Attention is next directed to FIG. 13B which depicts an alternative power supply 113b having multi-phase flyback topology which comprises a rectifier 1303a connected to the AC input 1101, which may be similar to the rectifier 1303, and generally rectifies AC power and remove outliers therefrom. The rectifier 1303a distributes power to two or more flyback circuits (e.g. as depicted "n" flyback circuits) that are connected in parallel and which operate in-synchronization and/or in-phase with each other. Each flyback circuit comprises a respective flyback controller and/or converter in communication with a planar transformer, which is in communication with a rectifier. For example, as depicted, a first flyback circuit comprises a flyback controller and/or converter 1350-1 in communication with a planar transformer 1309a-1 (which may be similar to the planar transformer 1309), which is in communication with a rectifier 1313a-1 (e.g. a synchronous rectifier, and/or which may be similar to the rectifier 1313). Similarly, as depicted, an "nth" flyback circuit comprises a flyback controller and/or converter 1350-n in communication with a planar transformer 1309a-n (which may be similar to the planar transformer 1309), which is in communication with a rectifier 1313a-n (e.g. a synchronous rectifier, and/or which may be similar to the rectifier 1313). The output from the flyback circuits is combined and provided to a buck regulator 1351a (which may regulate and/or control of the output of the flyback circuits to the DC output 1102, similar to the buck regulator 1351). In general, each of the flyback circuits converts a portion of the output of the rectifier 1303a from AC power to DC power and/or distributes such conversion therebetween. As such, each of the flyback circuits delivers a lower voltage and current (e.g. as compared to the voltage-fed buck plus push-pull topology of the power supply 113 of FIG. 13A) but collectively they provide a similar power output. As depicted, the power supply 113a includes a feedback circuit 1315a that monitors the output from the flyback circuits and controls the flyback controllers and/or converters 1350 to maintain a given output power thereof. Feedback control routing of the power supply 113a are depicted in dashed lines to distinguish from power routing depicted in solid lines. While not depicted the power supply 113a may include an opto-coupler, similar to the optocoupler 1317, between the feedback circuit 1315a and the flyback controllers and/or converters 1350 to maintain isolation between the AC power from the DC power in the power supply 113a.

The power supply 113 include yet further types of topologies including, but not limited to a half-bridge topology (e.g. which replaces the of the push-pull converter of the in buck plus push-pull topology), which may also be referred to as a buck plus half-bridge topology. In these examples, whereas the buck plus push-pull topology includes two sets of coils that occupy about half of the volume of the planar transformer, 1309 the half-bridge topology may include only one set of coils equivalent to one-quarter of the number of turns in the same transformer volume. Hence, the wiring of the one coil (e.g. copper and the like) can be thicker as compared to coils of the buck plus push-pull topology, which may improve DC resistance, and which may further improve (and/or reduces losses) transformer efficiency.

However, the half-bridge plus half-bridge topology includes additional capacitors over the buck plus push-pull topology and a more complicated MOSFET control circuit, for example in a chopper circuit thereof.

In yet further examples, the power supply 113 may include, but is not limited to, a full bridge topology (e.g. a full-bridge plus half-bridge topology and/or buck plus full-bridge topology), similar to the half-bridge topology and which includes a single coil, but has four MOSFET (e.g. in a chopper circuit) and four outputs.

In yet further examples, the power supply 113 may include, but is not limited to, one or more of forward convertor topology with active clamp/reset or without active clamp/reset. In yet further examples, the power supply 113 may include, but is not limited to, other isolated switch mode power supplies (SMPSs) and the like.

Indeed, the power supply 113 may include any suitable topology and/or combination of topologies (e.g. as described herein and/or as otherwise contemplated).

Figure 14:
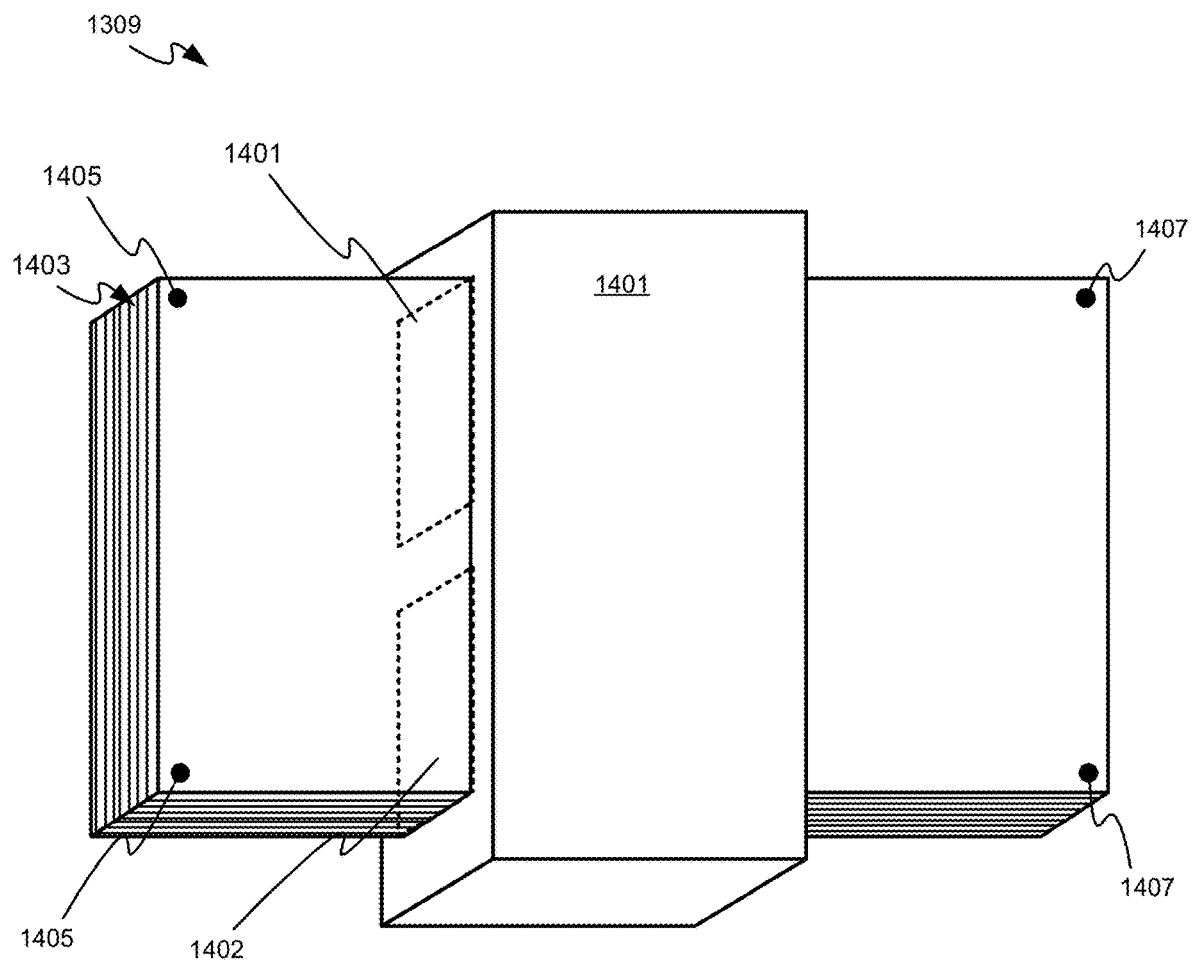
FIG. 14 depicts a planar transformer, that may be used with the device charger of FIG. 1, according to non-limiting embodiments.
Figure 15:
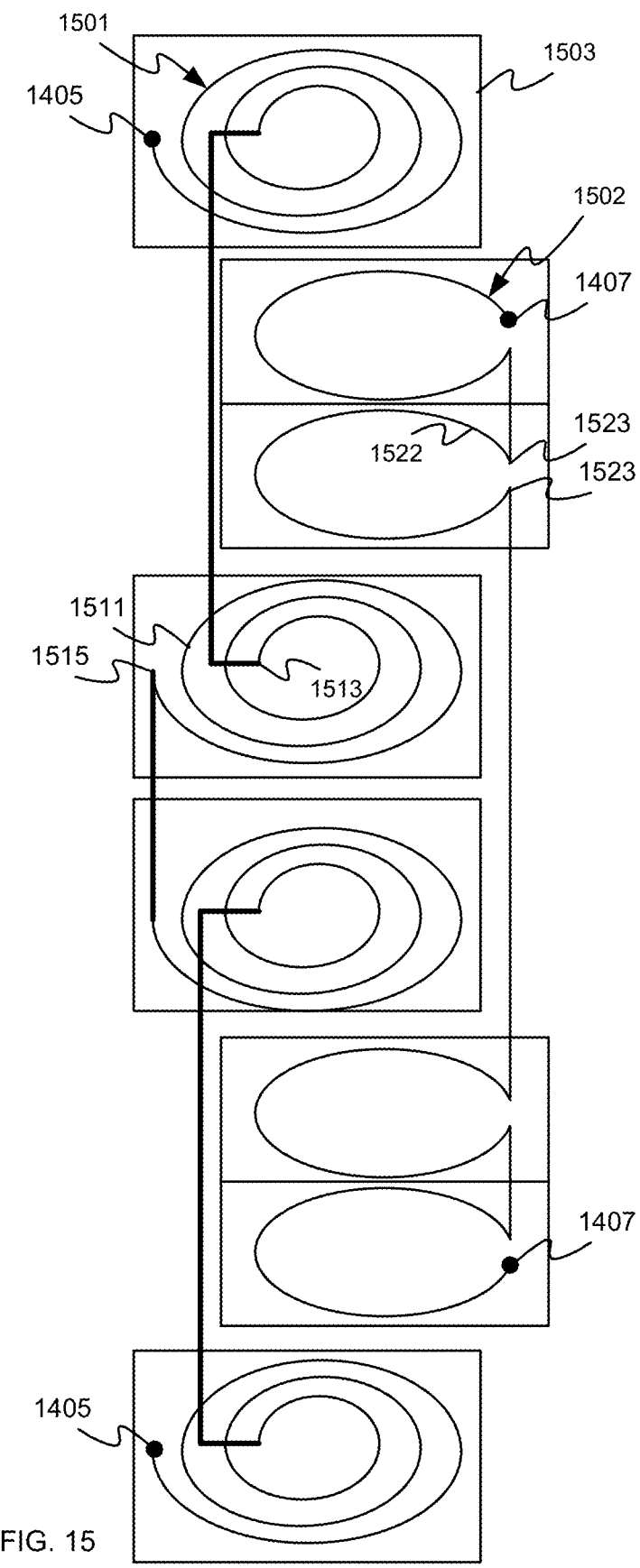
FIG. 15 depicts a schematic a primary circuit and a secondary circuit of the planar transformer of FIG. 14, according to non-limiting embodiments.
Figure 16:
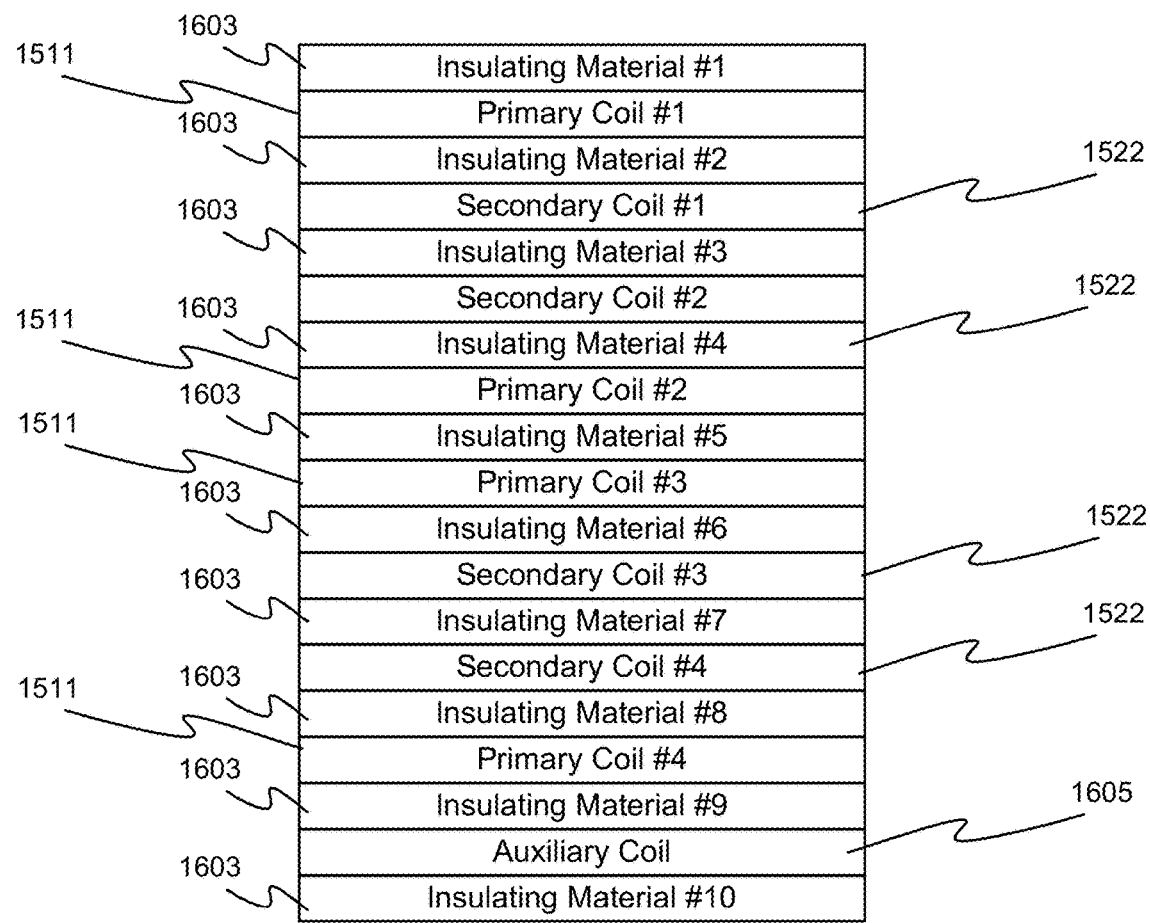
FIG. 16 depicts layers of the primary circuit and the secondary circuit of the planar transformer of FIG. 14, as well as an optional auxiliary coil, according to non-limiting embodiments.

The planar transformer 1309 is next described with respect to FIG. 14, FIG. 15 and FIG. 16, which respectively depict a perspective view of the planar transformer 1309, a primary side/circuit and secondary side/circuit of the planar transformer 1309, and a schematic diagram of layers of the planar transformer 1309.

With reference to FIG. 14, the planar transformer 1309 comprises a magnetic core 1401 that is less than 6.5 mm in height, and may comprise a ferrite material, but other types of magnetic materials are within the scope of the present specification. As depicted, the planar transformer is "E-shaped" with two apertures 1402 (e.g. each less than 6.5 mm in height) forming a central portion therebetween around which the primary circuit and the secondary circuit are wrapped, the primary circuit and the secondary circuit located for example on PCBs. However, in other examples, the magnetic core 1401 may be of any suitable shape and may not be E-shaped.

For example, the primary circuit and the secondary circuit may comprise layers of coils of individual 2-layer PCBs, or two or more multi-layer PCBs. In some examples, the planar transformer 1309 comprises flame retardant 4 (FR-4) materials; for example, PCBs and/or insulating material between layers of the primary circuit and the secondary circuit of the may comprise FR-4 materials.

As depicted in FIG. 14, the primary circuit and the secondary circuit, and insulating material therebetween, are depicted as layers 1403 which extend through the apertures 1402, which are depicted in dashed lines, as the apertures 1402 are hidden by the layers 1403; the primary circuit and the secondary circuit may be referred to as being physically integrated with the magnetic core 1401, as the primary circuit and the secondary circuit generally coil and/or wrap around the central portion of the magnetic core 1401, as defined by the apertures 1402.

Also schematically depicted in FIG. 14 are connections 1405 to the primary circuit to which the chopper circuit 1307 may be connected (e.g. as input to the planar transformer 1309), and connections 1407 to the secondary circuit to which the rectifier 1313 may be connected (e.g. as output from the planar transformer 1309). However, it is understood that the depicted locations of the connections 1405, 1407 may be varied and may depend on the physical layout of the primary circuit and the secondary circuit.

For example, attention is next directed to FIG. 15 which depicts coils of a primary circuit 1501 and a secondary circuit 1502 of the planar transformer 1309, for example located on PCBs 1503 (only one of which is indicated in FIG. 15, however it is understood rectangles in FIG. 15 correspond to PCBs 1503, which may include, but are not limited to, 2-layer PCBs, or two or more multi-layer PCBs, and the like). Furthermore, while the magnetic core 1401 is not depicted in FIG. 15, it is understood that coils of the primary circuit and the secondary circuit wrap around the central portion of the magnetic core 1401.

As depicted, the primary circuit 1501 comprises: a plurality of primary coils 1511 on PCBs 1503 around the central portion of the magnetic core 1401, each in a spiral shape having a center 1513 and an outer end 1515. As depicted, only one coil 1511, one center 1513 and one outer end 1515 is indicated, however, it is understood from FIG. 15 that in the depicted example, the primary circuit 1501 comprises four primary coils 1511. As depicted, respective outer ends 1515 of a first primary coil and a last primary coil 1511 (e.g. as depicted, top and bottom primary coils 1511) may be communication with the chopper circuit 1307. In particular, the outer ends 1515 of the first and last primary coils 1511 correspond to the connections 1405. Furthermore, adjacent primary coils 1511 may be connected either center-to-center 1513 or outer end-to outer end 1515, such that the plurality of primary coils 1511 form the primary circuit 1501 as a first continuous circuit in a same spiraling direction around the central portion of the magnetic core 1401. For example, as depicted, the top primary coil 1511 and the second from the top primary coil 1511 in FIG. 15 are connected center-to-center 1513, for example using vias through the PCBs 1503. Similarly, as depicted, the second and third primary coils 1511 in FIG. 15 are connected outer end-to outer end 1515, for example using vias through the PCBs 1503. While certain directions of the spirals of the coils 1511 are depicted, the coils 1511 may spiral in any suitable direction to form the primary circuit 1501.

Similarly, the secondary circuit 1502 comprises: a plurality of secondary coils 1522 around the magnetic core 1401, each in a circular and/or oval shape and connected to form the second circuit 1502 as a second continuous circuit wrapped around the central portion of the magnetic core 1401. Each of the coils 1522 has two ends 1523.

As depicted, only one coil 1522, and one pair of ends 1523 is indicated, however, it is understood from FIG. 15 that in the depicted example, the secondary circuit 1502 comprises four secondary coils 1522. As depicted, respective ends 1523 of a first secondary coil and a last secondary coil 1522 (e.g. as depicted, top and bottom secondary coils 1522) may be communication with the rectifier 1313. In particular, ends 1523 of the first and last secondary coils 1522 correspond to the connections 1407. Furthermore, adjacent secondary coils 1522 may be connected end-to-end 1523, such that the plurality of secondary coils 1522 form the secondary circuit 1502 as a second continuous circuit in a same spiraling direction around the central portion of the magnetic core 1401. While certain directions of the spirals of the coils 1522 are depicted, the coils 1522 may spiral in any suitable direction to form the secondary circuit 1502.

Furthermore, in the depicted example, the coils 1511, 1522 are selected to step down the voltage from about 50V to about 5 V.

It is further understood that the planar transformer 1309 also comprises insulating material (e.g. the PCBs 1503) between each of the plurality of primary coils 1511 and the plurality of secondary coils 1522.

Indeed, attention is next directed to FIG. 16 which depicts a schematic diagram of layers of the primary coils 1511, the secondary coils 1522, and insulating material 1603. As depicted, the planar transformer 1309 comprises (e.g.

around the central portion of the magnetic core 1401), in order from top to bottom: a first layer of the insulating material 1603; a first primary coil 1511; a second layer of the insulating material 1603; a first secondary coil 1522; a third layer of the insulating material 1603; a second secondary coil 1522; a fourth layer of the insulating material 1603; a second primary coil 1511; a fifth layer of the insulating material 1603; a third primary coil 1511; a sixth layer of the insulating material 1603; a third secondary coil 1522; a seventh layer of the insulating material 1603; a fourth secondary coil 1522; an eighth layer of the insulating material 1603;

a fourth primary coil 1511; and a ninth layer of the insulating material 1603.

Hence, the planar transformer 1309 has a general structure of two secondary coils 1522 located between two respective primary coils 1511, a structure that is repeated twice in the planar transformer 1309. In other configurations this structure may be repeated more than twice in the planar transformer 1309, with the dimensions of the planar transformer 1309 adjusted accordingly. Furthermore, a successful prototype of the example planar transformer 1309 (e.g. which was initially based on an electrical model and confirmed using a breadboard design), for example as incorporated into a successful prototype of the power supply 113 as depicted in FIG. 13A, provided DC output of 5V at a current of greater than about 4 A. However, other configurations and/s layouts of the planar transformer 1309 and primary coils 1511 and secondary coils 1522 are within the scope of the present specification.

Also depicted in FIG. 16 is an auxiliary coil 1605, for example located outside the primary coils 1511 and secondary coils 1522, at an end of the stack of layers depicted in FIG. 16 (e.g. under the ninth layer of the insulating material 1603), the auxiliary coil 1605 configured to power the chopper circuit 1307. A tenth layer of the insulating material 1603 is provided under the auxiliary coil 1605 to insulate the auxiliary coil 1605 from the magnetic core 1401. Indeed, the first layer of the insulating material 1603 insulates the first primary coil 1511 from the magnetic core 1401.

In general, thicknesses of each respective layer of the planar transformer 1309, and in particular thicknesses of the insulating material 1603, are selected to isolate the primary circuit 1501 from the secondary circuit 1502 and to minimize isolation between same-type coils (e.g. coils 1511 or coils 1522) and to maximize isolation between different-type coils (e.g. coils 1511, 1522). For example, isolation between same-type coils is minimized and isolation between different-type coils to reduce loss in the planar transformer 1309.

Furthermore, while the power supply 113 of FIG. 13A, FIG. FIG. 14 and FIG. 15 is described with respect to integration with the device 101, the power supply 113 may be used with other types of devices and/or may be provided and/or sold as a stand-alone component for use with other types of devices. Hence, while the PCB 1301 is of shape compatible with the first body 111, the PCB 1301 may be of any suitable shape and size.

Furthermore, other types of power supplies for use with the device 101 are within the scope of the present specification. For example, a power supply similar to the power supply 113 may be provided, but which lacks the buck regulator 1305; in these examples, the feedback circuit 1315 may be adapted to control the chopper circuit 1307 to control the output of the rectifier, and the chopper circuit 1307 may be powered by an auxiliary power supply that draws power from the AC input 1101 and/or the fully wave rectifier 1303.

Attention is next directed to FIG. 17, FIG. 18, FIG. 19 and FIG. 20 which shows details of an example retraction mechanism 152 and connectors 131, 132. While the example retraction mechanism 152 is described with respect to being integrated with the device 101, the example retraction mechanism 152 may be used with other types of devices and/or may be provided and/or sold as a stand-alone component for use with other types of devices.

Figure 17:
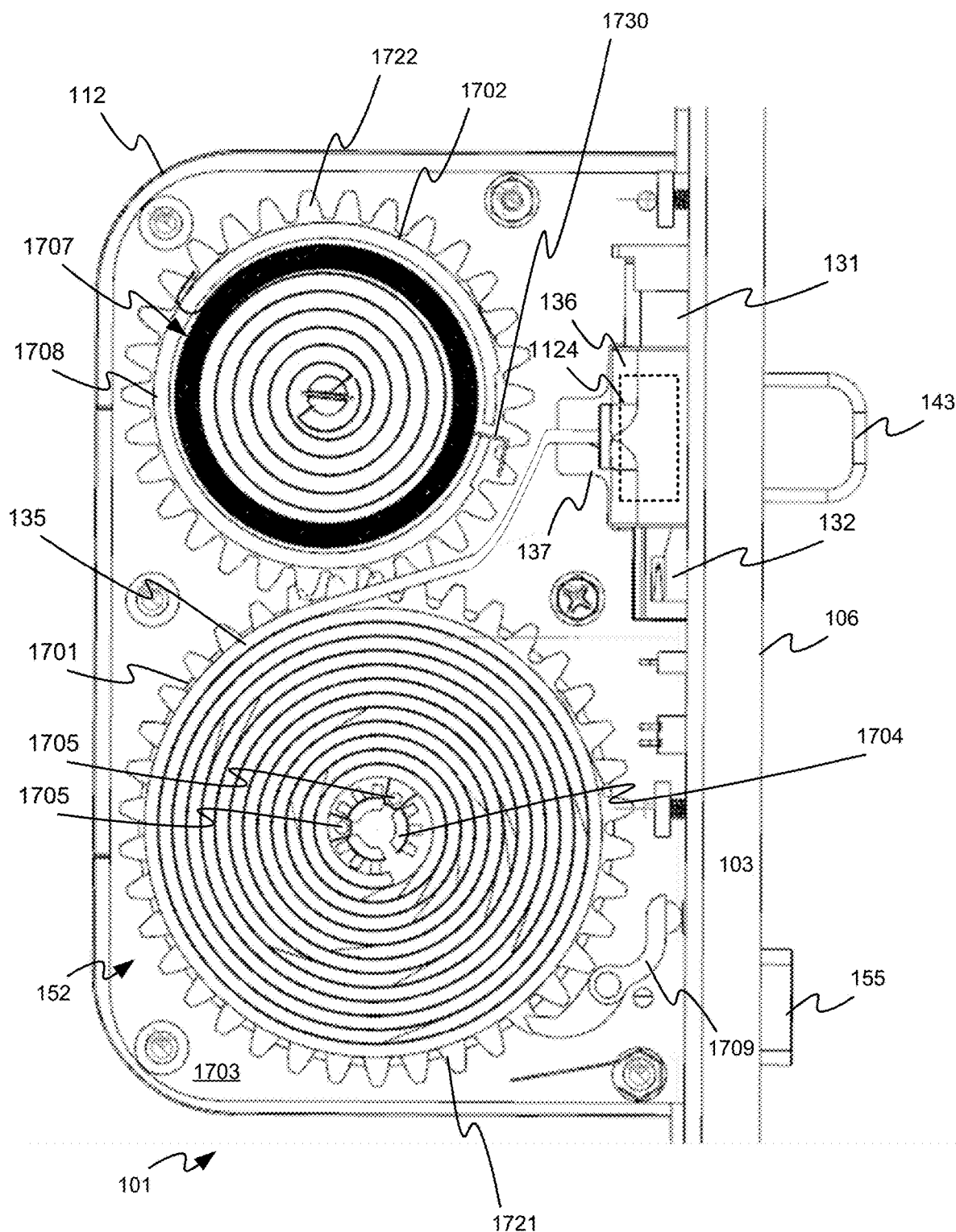
FIG. 17 depicts a retraction mechanism, that may be used with the device charger of FIG. 1, according to non-limiting embodiments.

Attention is first directed to FIG. 17 which depicts a right-side view of the device charger 101, with the wall 138 of the second body 112 removed (e.g. as compared to FIG. 4). As such, the connectors 131, 132 extending from the T-shaped connector 136 are shown, as well as further details of the recess 137, with the electrical circuit 1124 depicted in dashed lines, as the electrical circuit 1124 is internal to the T-shaped connector 136.

FIG. 17 further depicts details of the retraction mechanism 152 which comprises a first geared wheel 1701 and a second geared wheel 1702 interlocked with the first geared wheel 1701. As depicted, the first geared wheel 1701 is adjacent the button 155, and the second geared wheel is adjacent the recess 137 and/or the T-shaped connector 136. Furthermore, each of the geared wheels 1701, 1702 are mounted on a PCB 1703 which may at least partially form a wall of the second body 112 adjacent the aperture 105, and provide stiffness to the second body 112. Furthermore, portions of the first geared wheel 1701 may comprise PCBs, as described in more detail below, for example portions of the first geared wheel 1701 that convey power from the DC output 1102 to the retractable cord 135.

The first geared wheel 1702 generally includes: a spindle 1704 around which the retractable cord 135 wraps; and respective electrical connections 1705 around the spindle 1704 from the retractable cord 135 to symmetrical concentric multi-ring slip rings (shown in detail in FIG. 19A and FIG. 19B) in electrical communication with the DC output 1102 of the AC-to-DC power supply 113 via the electrical circuit 1103 of the faceplate 103.

It is understood that the retractable cord 135 includes at least a "high" electrical wire and a "low" electrical wire therein, that carries the DC voltage to the connectors 131, 132, and the electrical connections 1705 are connected to respective wires of the retractable cord 135.

As also depicted in FIG. 17, the second geared wheel 1702 includes a spring mechanism 1707 for providing tension to the first geared wheel 1701, to cause the second geared wheel 1702 to rotate the first geared wheel 1701 to retract the retractable cord 135, for example when the retractable cord 135 is extended. As depicted, the spring mechanism 1707 includes a spring internal to the second geared wheel 1702, which is attached to the center of the second geared wheel 1702, and concentrically arranged around the center of the second geared wheel 1702, and further attached to an outer wall 1708 of the second geared wheel 1702. Hence, when the second geared wheel 1702 turns, in response to the first geared wheel 1701 turning as the retractable cord 135 is extended from the device 101 (e.g. via the handle 143), the spring of the spring mechanism 1707 tightens, placing tension on the first geared wheel 1701.

Returning to FIG. 17, the retraction mechanism 152 further comprises a ratchet 1709 for preventing one or more of the first geared wheel 1701 and the second geared wheel 1702 from retracting the retractable cord 135 as the retractable cord is extended. The retraction mechanism 152 further comprises the button 155 at the front side 106 of the faceplate 103, the button 155 mechanically connected to the ratchet 1709, the button 155 configured to release the ratchet 1709 such that, when the button 155 is actuated, the second geared wheel 1702 turns via the spring mechanism 1707 to cause the first geared wheel 1701 to retract the retractable cord 135 to wrap around the spindle 1704.

For example, as depicted, the ratchet 1709 is located to engage first teeth 1721 of the first geared wheel 1701, to prevent the first geared wheel 1701 from retracting the retractable cord 135 as the retractable cord 135 is extended. As each of the first teeth 1721 pass the ratchet 1709, as the first geared wheel 1701 turns, a next tooth 1721 is engaged by the ratchet 1709. However, the ratchet 1709 is released from engaging the first teeth 1721 of the first geared wheel 1701 when the button 155 is actuated (e.g. actuation of the button 155 causes the ratchet to rotate about a central pivot point, which disengages the ratchet 1709 from the first teeth 1721). It is further understood that, while not depicted, the button 155 may include a spring mechanism to bias the button 155 to a position where the ratchet 1709 engages the first teeth 1721.

However, in other examples, the ratchet 1709 may be positioned to engage second teeth 1722 of the second geared wheel 1702, to prevent the second geared wheel 1702 from retracting the retractable cord 135 as the retractable cord 135 is extended; in these examples, the ratchet 1709 is further adapted to be released by the button 155 in this position, for example, via an arm, and the like, extending from the ratchet 1709 to the button 155.

As depicted, the second geared wheel 1702 further comprises an arm and/or a "tooth" 1730 which extends from the outer wall 1708 (e.g. "above" the second teeth 1722, see FIG. 18); in some examples, the ratchet 1709 may be positioned to engage the tooth 1730 of the second geared wheel 1702, to prevent the second geared wheel 1702 from retracting the retractable cord 135 as the retractable cord 135 is extended. In these examples, the second geared wheel 1702 rotates through one turn before the tooth 1730 is next engaged by the ratchet 1709 (e.g. the ratchet engages the tooth 1730 each time the second geared wheel 1702 rotates through 360°), which may be desirable to reduce noise of the retraction mechanism 152 (e.g. each time the ratchet 1709 engages a tooth 1721, a tooth 1722 or the tooth 1730, a clicking sound may occur). Indeed, a ratio of the first teeth 1721, of the first geared wheel 1701, to the second teeth 1722 (and/or the tooth 1730), of the second geared wheel 1702, may be one of: greater than one; less than one; or one.

While not depicted, the device 101 may further include guide posts to guide the retractable cord 135 and which may also provide strain relief as the retractable cord 135 is extended and/or retracted. Indeed, it is further understood that the retractable cord 135 is connected to the T-shaped connector 136, for example via an overmold material; hence an attachment region of the retractable cord 135 and/or the T-shaped connector 136 may provide strain relief.

In some examples, a length of the the retractable cord 135 may be between about 30 inches to about 40 inches long. In some examples, the retractable cord 135 may be adapted to have a cross-section that is about 3 mm wide by about 1.1 mm thick to fit into the compact space of the retraction mechanism 152 (e.g. around the spindle 1704) when retracted. However, the retractable cord 135 may be shorter than 36 inches with a cross-section of about 4 mm wide by about 1.5 mm thick (this wider and thicker cord would be shorter in length in order to fit into the compact space of the retraction mechanism 152 (e.g. around the spindle 1704)). In some examples, the retractable cord 135 may have a resistance of less than about 100 ohms/km.

Figure 18:
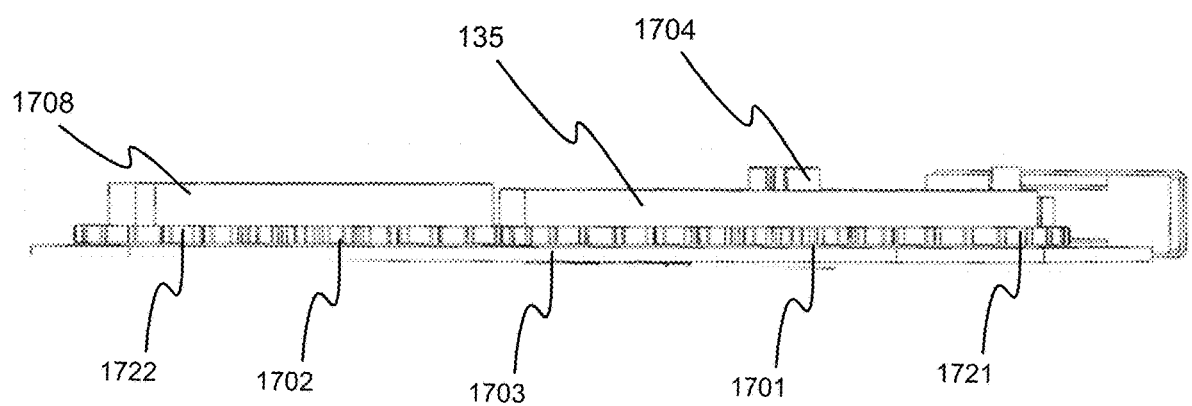
FIG. 18 depicts a side view of geared wheels of the retraction mechanism of FIG. 17, according to non-limiting embodiments.

Attention is next directed to FIG. 18, which depicts a side view of the geared wheels 1701, 1702. From FIG. 18, it is apparent that teeth 1721, 1722 of each of the geared wheels 1701, 1702 are at a side of the geared wheels 1701, 1702 adjacent the PCB 1703. For example, the outer wall 1708 of the second wheel 1702 extends cylindrically from the second wheel 1702 to contain the spring of the spring mechanism 1707. While not depicted, the second geared wheel 1702 may further include a cover to enclose the spring of the spring mechanism 1707.

From FIG. 18, it is further apparent that the spindle 1704 of the first geared wheel 1701 extends perpendicularly from the first geared wheel 1701, and that the retractable cord 135 wraps around the spindle 1704, residing on a portion of the first geared wheel 1701 from which the first teeth 1721 extend.

Figure 19A:
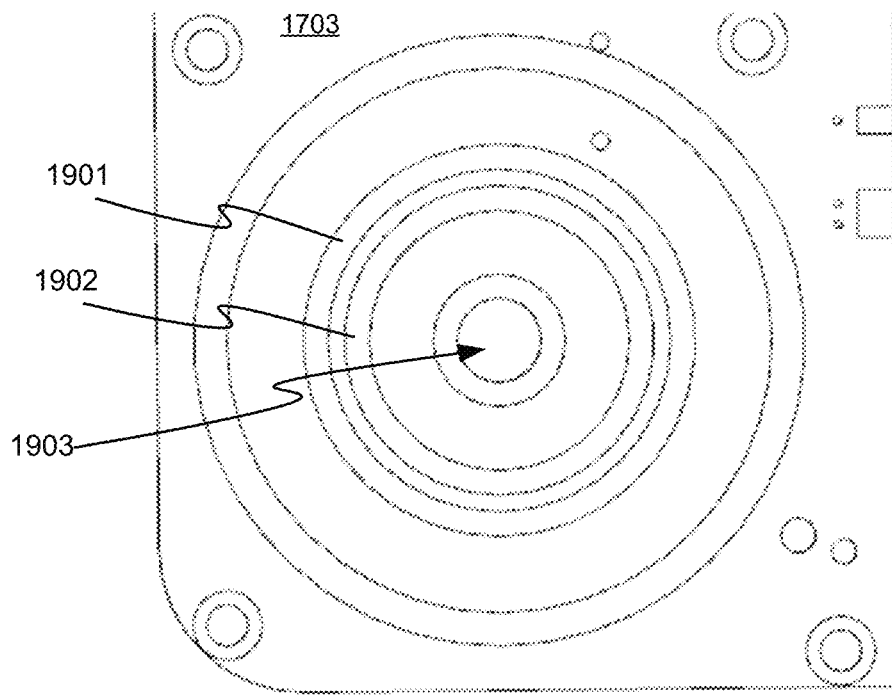
FIG. 19A depicts a portion of a printed circuit board (PCB) used with a first geared wheel of the retraction mechanism of FIG. 17, according to non-limiting embodiments.
Figure 19B:
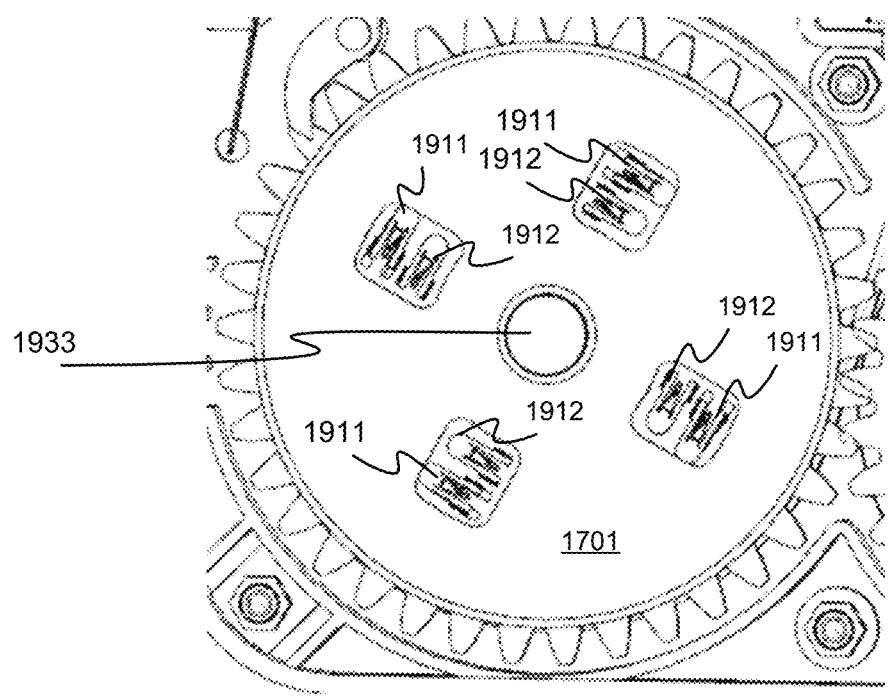
FIG. 19B depicts a side of the first geared wheel adjacent the PCB of the retraction mechanism of FIG. 17, according to non-limiting embodiments.

The symmetrical concentric multi-ring slip rings of the retraction mechanism 152 are next described with respect to FIG. 19A and FIG. 19B which respectively depict a portion of the PCB 1703 at which the first geared wheel 1701 is supported and/or rotates and a side of the first geared wheel 1701 that is adjacent the PCB 1703.

With reference to FIG. 19A, two concentric conducting rings 1901, 1902 are located on the PCB 1703, which are in electrical communication with the DC output 1102 of the power supply 113 (e.g. via the electrical circuit 1103 of the faceplate 103). For example, one of the rings 1901, 1902 is connected to a "high" electrical output of the DC output 1102, and the other of the rings 1901, 1902 is connected to a "low" electrical output of the DC output 1102.

The PCB 1703 further comprises an aperture 1903 which provides rotational support for the first geared wheel 1701.

With reference to FIG. 19B, the first geared wheel 1701 comprises a plurality of prongs 1911, 1912 (described in more detail with respect to FIG. 20), each of which arranged to provide stability between the first geared wheel 1701 and the conductive rings 1901, 1902 of the symmetrical concentric multi-ring slip rings, and to electrically contact the conductive rings 1901, 1902 as the first geared wheel 1701 rotates. Furthermore, the plurality of prongs 1911, 1912 may be mounted to a PCB (e.g. which may be a clover shape, and the like (and/or any suitable shape), inset in the first geared wheel 1701, the PCB providing electrical connections from the plurality of prongs 1911, 1912 to the respective electrical connections 1705 at the spindle 1704. With brief reference to FIG. 20, which depicts a perspective view of a prong 1911, 1912, each of the prongs 1911, 1912 comprises a conductive spring contact with a spring portion 2001 that extends towards a respective conductive ring 1901, 1902 to make electrical contact therewith.

For example, comparing FIG. 17, FIG. 19A and FIG. 19B, each of the prongs 1911, 1912 is in electrical communication with respective electrical connections 1705 of the spindle 1704 such that, as the prongs 1911, 1912 contact the conducting rings 1901, 1902, the DC output 1102 of the power supply 113 is connected to the connectors 131, 132.

As depicted, the prongs 1911 are arranged to contact the larger and/or outer conducting ring 1901, and the prongs 1912 are arranged to contact the smaller and/or inner conducting ring 1902. Furthermore, eight prongs 1911, 1912 (e.g. four of prongs 1911, and four of prongs 1912) are provided, arranged in an "X" pattern which provides stability to the first geared wheel 1701 as it rotates. Put another way, a pair of prongs 1911, 1912 are arranged along four radii of the first geared wheel 1701, the four radii being at 90° intervals. however, any suitable number of prongs 1911, 1912, arranged in any suitable pattern is within the scope of the present specification.

FIG. 19B further depicts a central axle 1933 of the first geared wheel 1701 which may be supported by the aperture 1903 of the PCB 1703. While not depicted, the PCB 1703 and the second geared wheel 1702 includes similar aperture/axle arrangement.

Figure 21:
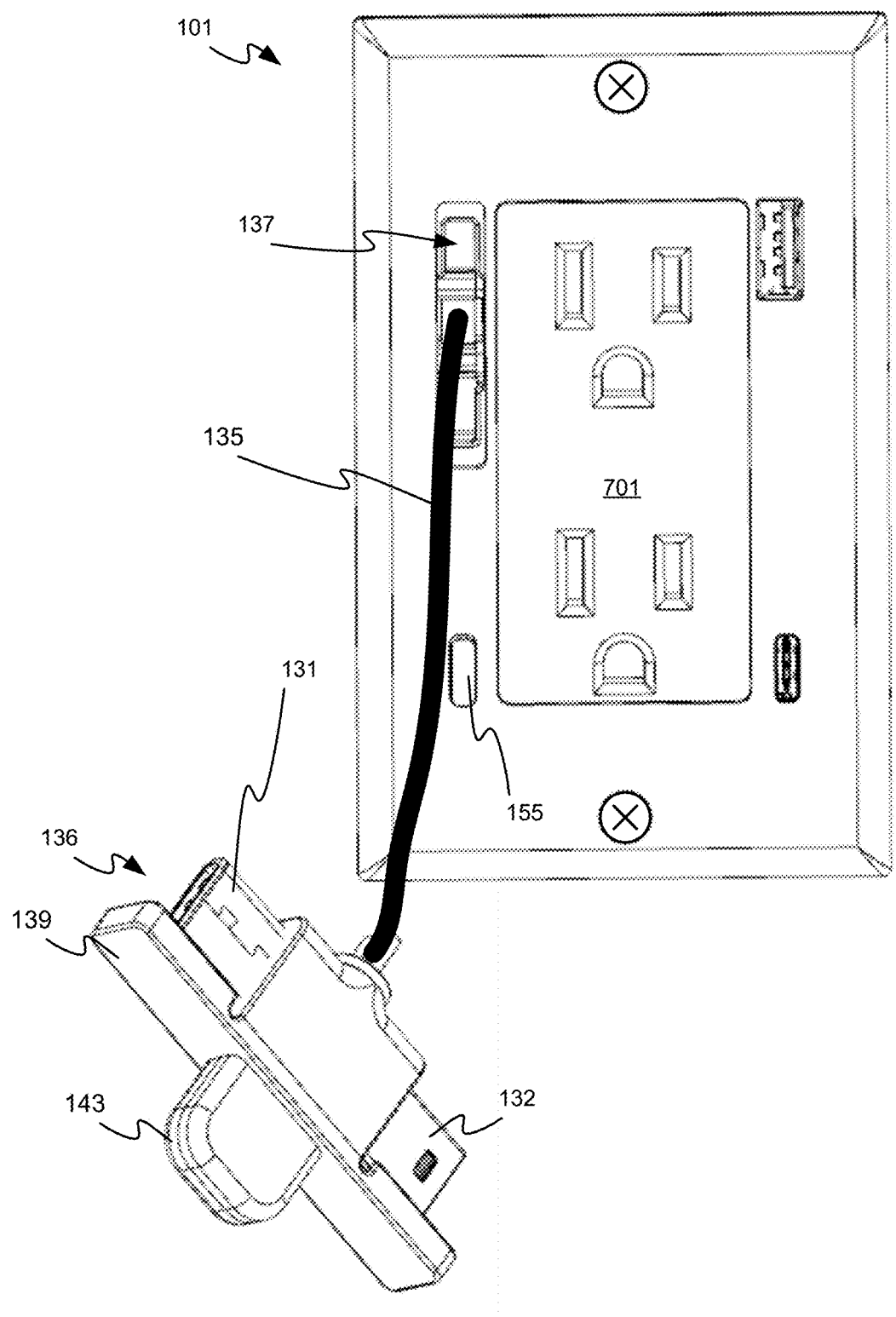
FIG. 21 depicts a front view of the device charger with an extended T-shaped connector, according to non-limiting embodiments.

Attention is next directed to FIG. 21 which depicts the device 101 in use with the electrical outlet 701 and with the T-shaped connector 136 extended from the recess 137 via the retractable cable 135 (depicted schematically in FIG. 21), for example, when a user of the device 101 grabs the handle 143 of the T-shaped connector 136 and pulls the T-shaped connector 136 from the recess 137.

Figure 22:
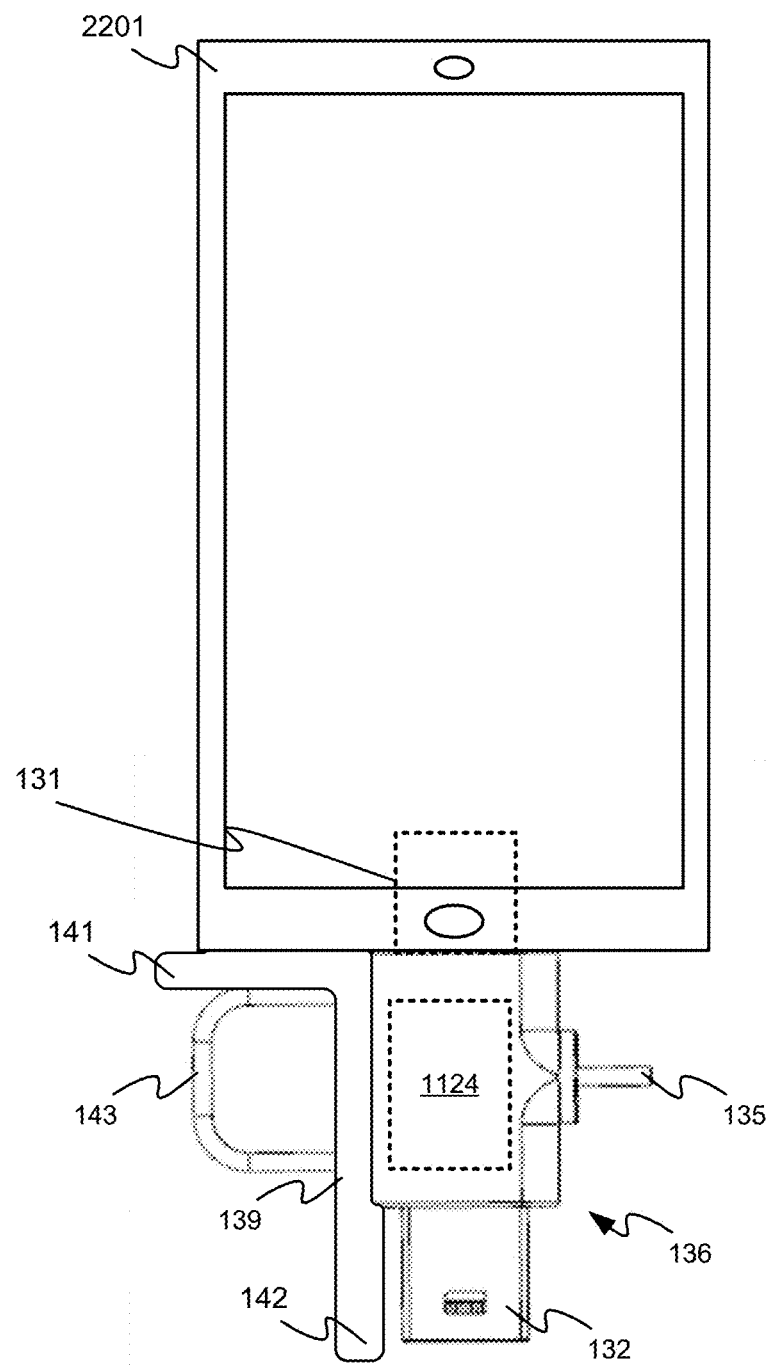
FIG. 22 depicts the T-shaped connector in use with an external device, according to non-limiting embodiments.

Attention is next directed to FIG. 22 which depicts the T-shaped connector in use with an external device 2201; while the remainder of the device 101 is not depicted, it is understood that the retractable cord 135 is extending from the device 101, similar to as depicted in FIG. 21.

In particular, FIG. 22 depicts the connector 131 inserted into a port of the external device 2201 (e.g. a cell phone, and the like), to charge the external device 2201. In FIG. 22, the connector 131 is depicted in dashed lines indicating that the connector 131 is plugged into the external device 2201 and/or is presently internal to the external device 2201.

Furthermore, as also depicted in FIG. 22, the first flap 141 of the flexible cover 139, that covers the connector 131 has been folded towards the handle 143 so that the connector 131 may be inserted into the external device 2201. As the second connector 132 is not in use in FIG. 22, the second flap 142 of the flexible cover 139, that covers the second connector 132 has not been folded. However, the second flap 142 may also be folded towards the handle 143 when the second connector 132 is inserted into a second external device (not depicted) to charge the second external device. For example, the flexible cover 139 and/or the flaps 141, 142 may comprise a silicone material and/or any other suitable flexible material. Furthermore, the flaps 141, 142 may be biased to cover the respective connectors 131, 132 such that when the external device 2201 (and/or a second external device) is disconnected from a respective connector 131, 132, the flaps 141, 142 return to a covering position.

Also depicted in FIG. 22 is the electrical circuit 1124 (depicted in dashed lines as the electrical circuit 1124 is internal to the T-shaped connector 136) which may detect that the connector 131 is connected to the external device 2201 and that the connector 132 is not connected to an external device, which may cause power to be directed to the connector 131 and not the connector 132.

While not depicted, the T-shaped connector 136 may be at least partially encased in an overmolded body, and may include a plurality of PCBs which are connected and/or layered together to drive one or more of the connectors 131, 132 (e.g. one or more of the plurality of the PCBs may include the electrical circuit 1124 which distributes power to the connectors 131, 132). The one or more PCBs (e.g. including the electrical circuit 1124) are selected to fit within the overmolded body. For example, in a successful prototype the overmolded body of the T-shaped connector 136 is about 13.5 mm (+/−1.5 mm) tall (e.g. along the axis between the connectors 131, 132) by about 10 mm (+/−1 mm) deep (e.g. from front to back, or from where the handle 143 attaches to the flaps 141, 142 to where the retractable cord 135 is attached to the T-shaped connector 136) by about 6 mm (+/−1 mm) (e.g. from side to side).

The shape and attachment configuration of the plurality of PCBs within the T-shaped connector 136 may depend on a type of the connectors 131, 132. In examples where the connector 131 comprises an Apple™ Lightning™ connector and the connector 132 comprises a USB-C connector, a PCB that extends from the Lightning™ connector (e.g. at a rear end) fits into an opening of a U-shaped PCB of the USB-C connector (e.g. also at a rear end), for example like a lock and key, and a third PCB may be layered on top of this lock and key PCB configuration, adjoining and electrically connecting the underlying two PCBs of the connectors 131, 132. In this configuration, the electrical circuit 1124 may be located at the third PCB, and the third PCB may be a primary electrical connection between the T-shaped connector 136, the PCBs of the connectors 131, 132 and the retractable cord 135. In alternative examples of the connectors 131, 132, the plurality, shape and configuration of PCBs within the T-shaped connector 136 may be adapted to accommodate the electrical and/or physical specifications of the connectors 131, 132 (e.g. when one or more of the connectors 131, 132 include other types of connectors).

Figure 20:
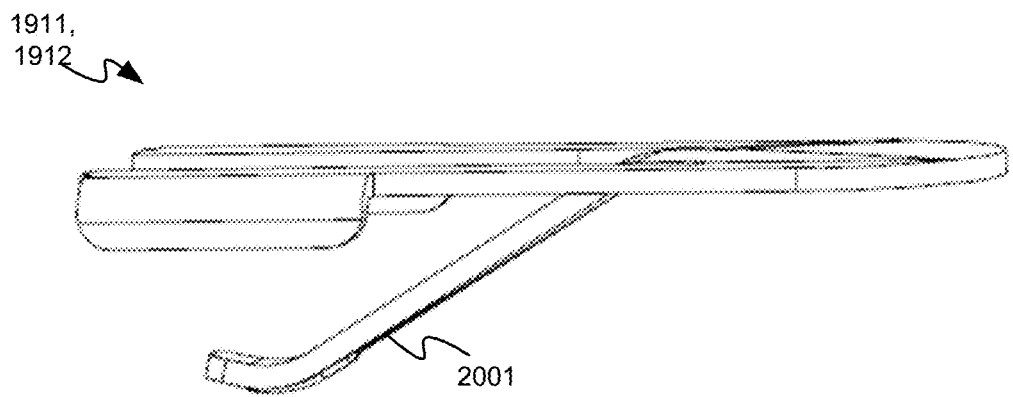
FIG. 20 depicts a prong of the first geared wheel used in a slip ring, according to non-limiting embodiments.

It is further understood that each of the power supply 113 of FIG. 13A, FIG. 14 and FIG. 15, the retraction mechanism 152 of FIG. 17, FIG. 18 and FIG. 19, the T-shaped connector of FIG. 20 and FIG. 21 may be implemented with devices other than the device 101 and/or each may be provided as stand-alone components for use or sale and/or for integration with other types of devices.

Furthermore, the device 101 may be adapted to include other types of power supplies and/or other types of retraction mechanisms and/or other types of connectors.

Furthermore, the device 101 may be adapted to include a battery at the second body 112, for example as depicted in FIG. 12, and may not comprise a retraction mechanism.

Furthermore, the device 101 may include only charging ports at the faceplate 103 and may not include a retraction mechanism; in these examples, the second body 112 may be adapted to include the electrical contact 122, and no other electrical components, with a size and shape of the second body 112 adapted accordingly. For example, in some examples, the second body 112 may comprise a rigid extension from the rear side 108 of the faceplate 103, the rigid extension having the electrical contact 122 mounted thereupon with a thickness and/or material of the rigid extension configured to maintain rigidity thereof. For example, such a rigid extension may comprise a PCB with the electrical contact 122 mounted thereupon and electrical routing to the electrical circuit 1103 of the faceplate 103, with suitable insulating material covering and/or encasing such electrical routing.

In some examples, the device 101 may be adapted to include other types of devices in the second body 112, including, but not limited to, communication devices such as a networking adapter and/or a power-line networking adapter powered by the power supply 113; in some of these examples, the faceplate 103 may include a network connector at the front side 106.

In yet further examples, the device 101 may be adapted for use with ganged electrical outlets and/or junction boxes that include ganged electrical outlets; in such examples the device 101 and/or the faceplate 103 is adapted to dimensions of such ganged electrical outlets and/or junction boxes. Furthermore, the device 101 may include more than one aperture 105, for example a respective aperture 105 for each ganged electrical outlet. Furthermore, in these examples, the first body 111 and/or the second body 112 maybe adapted to extend between two of the apertures 105 and/or between two ganged electrical outlets.

Figure 23A:
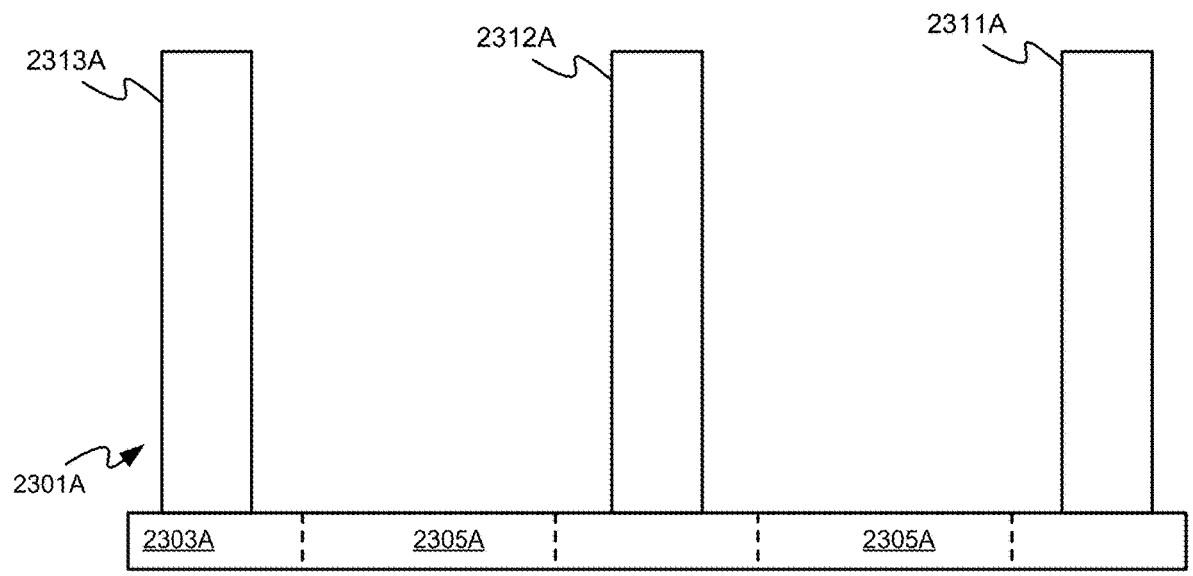
FIG. 23A depicts a top view of an alternative device charger, according to non-limiting embodiments.

Attention is next directed to FIG. 23A which schematically depicts a top view of a device 2301A similar to the device 101, and including a faceplate 2303A having two apertures 2305A (depicted in dashed lines to indicate that the apertures 2305A are through the faceplate 2303A similar to the aperture 105 through the faceplate 103), a first body 2311A, a second body 2312A, and a third body 2313A extending from a rear side of the faceplate 2303A. A first one of the bodies 2311A, 2312A, 2313A may include a power supply, similar to the power supply 113, a second one of the bodies 2311A, 2312A, 2313A may include a retraction mechanism, similar to the retraction mechanism 152, and a third one of the bodies 2311A, 2312A, 2313A may include a battery, similar to the battery 1201. Such components may be provided in the bodies 2311A, 2312A, 2313A in any suitable combination, and the bodies 2311A, 2312A, 2313A may include any suitable combination of components describe herein. Furthermore, in these examples, an electrical circuit of the faceplate 2303A may include the components of both the examples depicted in FIG. 11 and FIG. 12. While electrical connectors (similar to connectors 131, 132, 133, 134) are not depicted, they are nonetheless assumed to be present.

Furthermore, in some examples, the device 2301A may be adapted to conjoin at least two of the bodies 2311A, 2312A, 2313A.

Figure 23B:
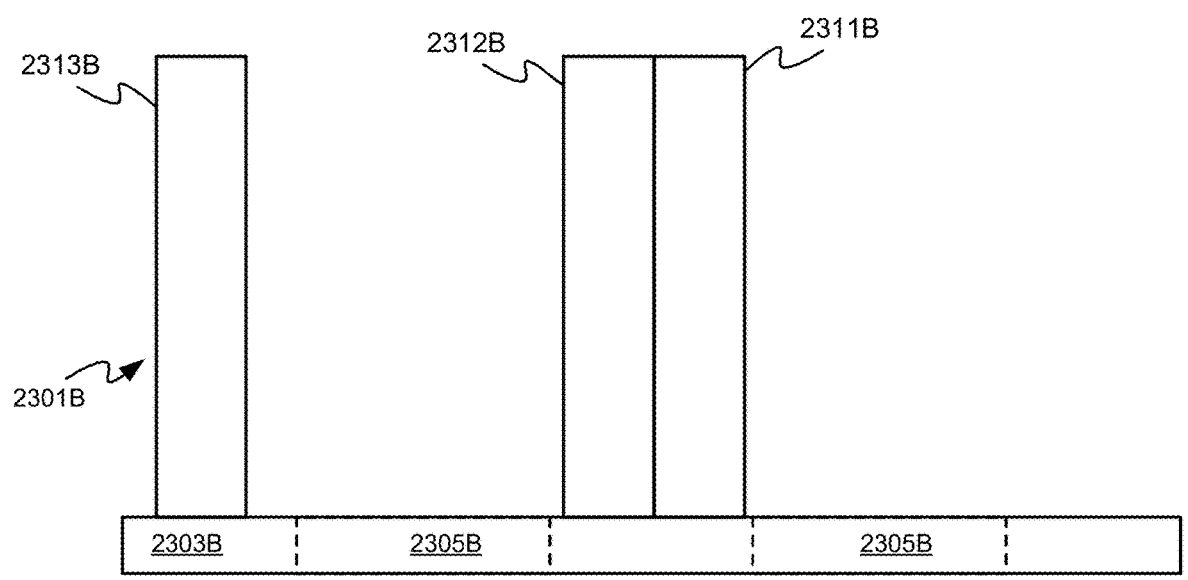
FIG. 23B depicts a top view of an alternative device charger, according to non-limiting embodiments.

For example, attention is next directed to FIG. 23B which schematically depicts a top view of a device 2301B similar to the device 2301A, and including a faceplate 2303B having two apertures 2305B (depicted in dashed lines to indicate that the apertures 2305B are through the faceplate 2303B), a first body 2311B, a second body 2312B, and a third body 2313B extending from a rear side of the faceplate 2303B, which contain a power supply, a retraction mechanism, and a battery. However, in contrast to the device 2301A. the bodies 2311A, 2312B are conjoined and located between the apertures 2303B.

In some jurisdictions, electrical outlets (e.g. in some jurisdictions, for example in Europe) are provided with a faceplate integrated with the electrical outlet (e.g. as an integrated body), and the device 101 may be adapted accordingly. In these examples, the device 101 may not include an aperture and/or the contacts 121, 122. Rather, the device 101 may be configured to replace an existing electrical outlet and faceplate combination in a junction box, the device 101 adapted to include connectors to a mains power supply within the junction box. In these examples, the device 101 may include any suitable combination of the power supply 113 of FIG. 13A, FIG. 14 and FIG. 15, the retraction mechanism 152 of FIG. 17, FIG. 18 and FIG. 19, and the T-shaped connector of FIG. 20 and FIG. 21.

Figure 24:
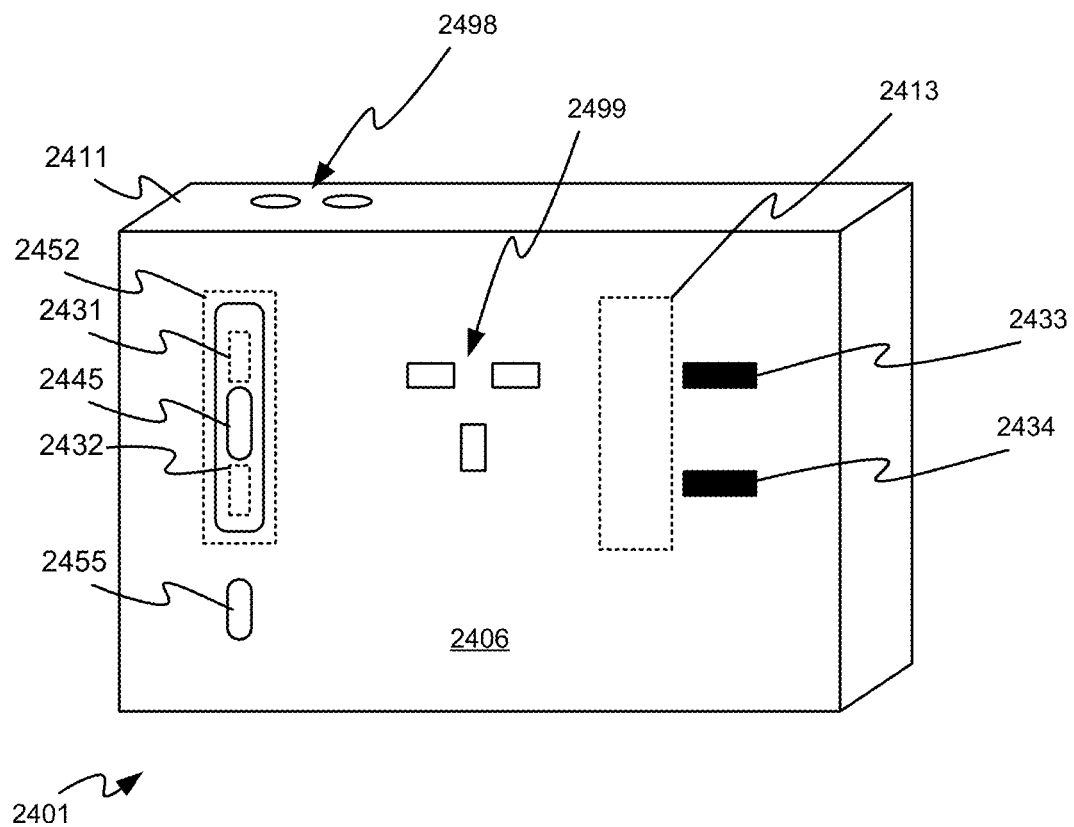
FIG. 24 depicts a front view of an alternative device charger, according to non-limiting embodiments.

For example, attention is next directed to FIG. 24 which depicts a perspective view of device 2401, which is substantially similar to the device 101, with like components having like numbers however in a "2400" series rather than a "100" series. Furthermore, while some internal and/or recessed and/or retracted components of the device 2401 are not depicted in FIG. 24, they are nonetheless understood to be present.

The device 2401 does not include an aperture, and is of a shape and size to replace an existing electrical outlet and faceplate integrated combination in a junction box. As depicted, the device 2401 includes a body 2411 which includes a front side 2406 at which at least one electrical connector is located, for example connectors 2431, 2432, 2433, 2434, respectively similar to the connectors 131, 132, 133, 134.

The device 2401 further includes a power supply 2413 (which may be similar or different from the power supply 113 of FIG. 13A, FIG. 14 and FIG. 15, and which is depicted in dashed lines as the power supply 2413 is located internal to the device 2401) which powers the connectors 2431, 2432, 2433, 2434. The connectors 2431, 2432 are also depicted in dashed lines as, like the connectors 131, 132, the connectors 2431, 2432 extend from a T-shaped connector (e.g. recessed into the device 2401 and hence hidden in FIG. 24) similar to the T-shaped connector 136. Hence, the connectors 2431, 2432 may be attached to a retraction mechanism 2452 (which may be similar or different from the retraction mechanism 152 of FIG. 17, FIG. 18 and FIG. 19, and which is depicted in dashed lines as the retraction mechanism 2452 is located internal to the device 2401). The connectors 2431, 2432 hence may be attached to the retraction mechanism 2452 via a retractable cable (e.g. retracted into the device 2401 and hence hidden in FIG. 24) similar to the retractable cable 135. Also visible in FIG. 24 are a handle 2445 for extending the T-shaped connector and/or the connectors 2431, 2432 and/or the retractable cable, and a button 2455 for causing the retraction mechanism 2452 to retract the T-shaped connector and/or the connectors 2431, 2432 and/or the retractable cable.

As depicted, the device 2401 further includes connectors 2498 for connecting the power supply 2413 to a mains power supply, for example in a junction box. While the connectors 2498 are schematically depicted on a top of the device 2401, the connectors 2498 may include any suitable connectors for connecting to a mains power supply in any suitable location, for example compatible with a given electrical code in a given jurisdiction.

As depicted, the device 2401 further comprises at least one electrical outlet 2499 which may also be connected to the connectors 2498, and which may be used to power external devices that operate via AC power. However at least one electrical outlet 2499 is understood to be optional.

In yet further examples, the device 2401 may include other components including, but not limited to, one or more switches for turning the power supply 2413 (and/or the at least one electrical outlet 2499) on and off, one or more fuses, a battery (which may be provided in addition to the retraction mechanism 2452 within the body 2411), and the like.

In yet further examples, the device 101 may be adapted for use outside a junction box (and/or outside a wall), and hence may include a cord and/or a plug for plugging into an electrical outlet, for example for use as a stand-alone charging device and/or as an extension cord.

Figure 25:
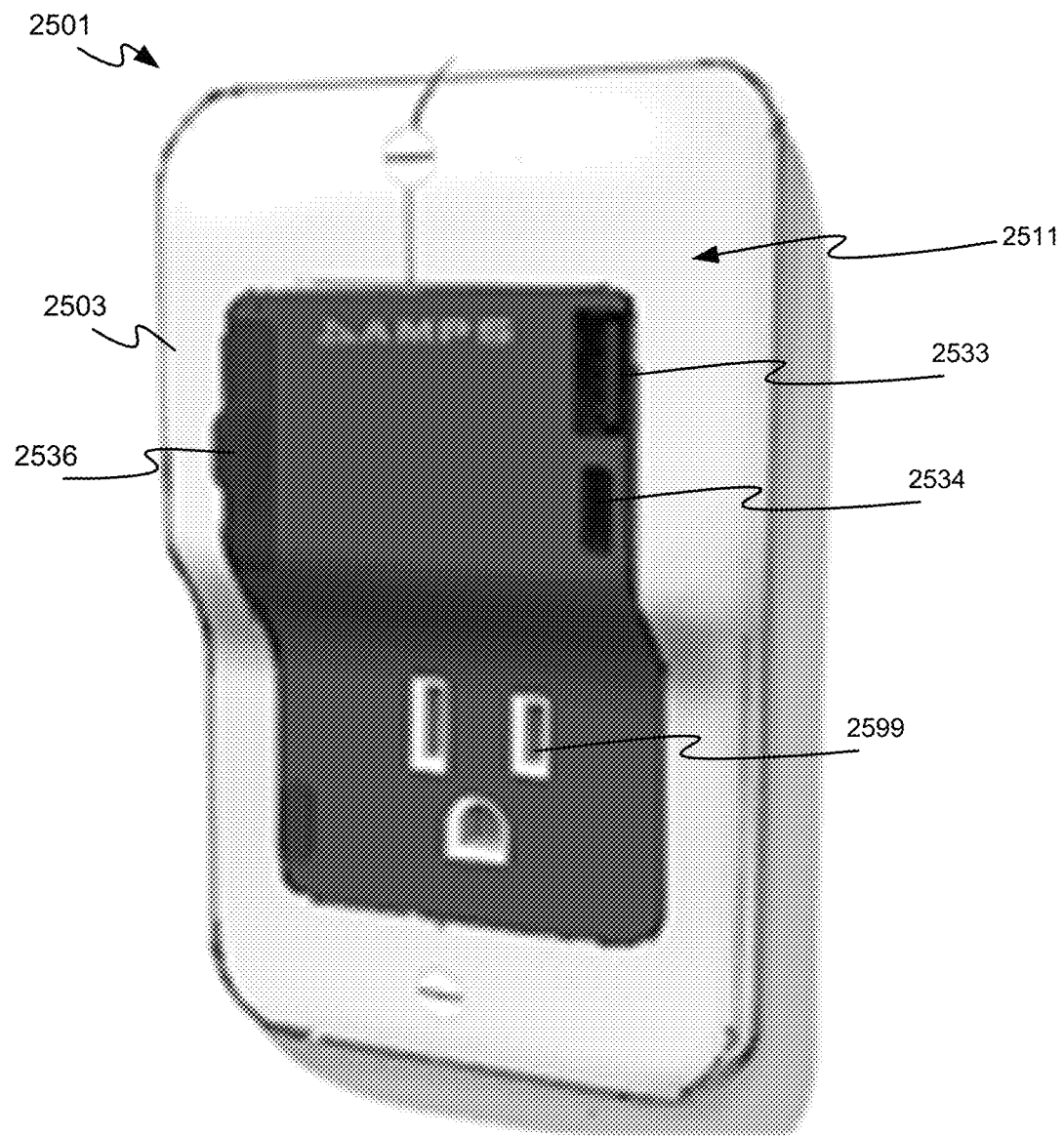
FIG. 25 depicts a front perspective view of an alternative device charger, according to non-limiting embodiments.
Figure 27A:
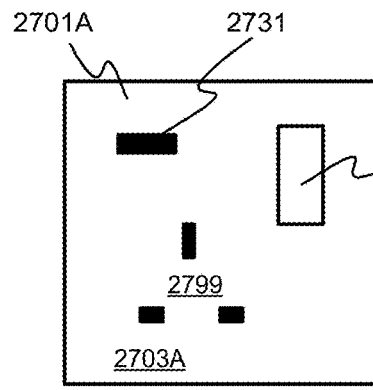
Figure 27B:
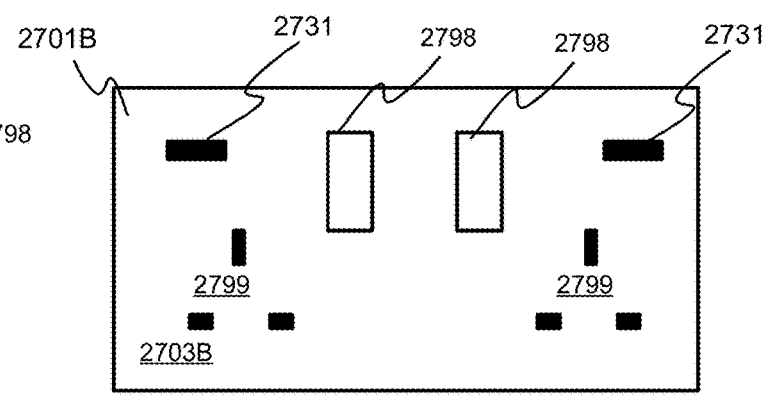
Figure 27C:
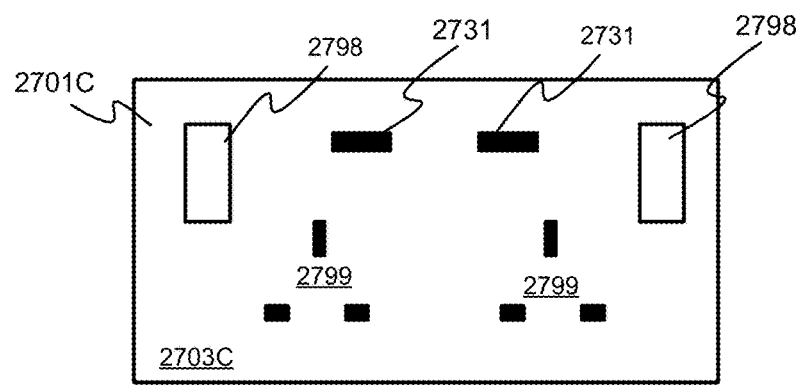
Figure 27D:
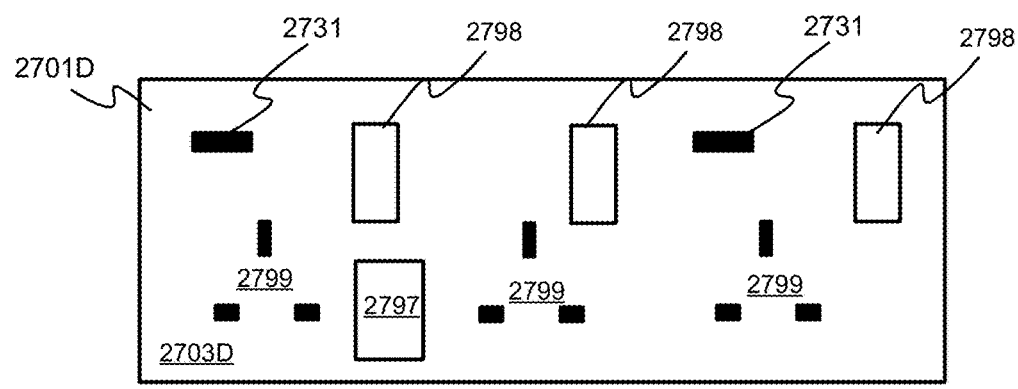

For example, attention is directed FIG. 25 which depicts a perspective front view of the device 2501 that includes a faceplate 2503, a body 2511 that bulges from a front of the faceplate 2503, a T-shaped connector 2536, similar to the T-shaped connector 136, (and which includes two connectors similar to the connectors 131, 132) and two electrical connectors 2533, 2534 similar to the connectors 133, 134. The device 2501 further includes an electrical outlet 2599. While not depicted, a rear side of the device 2501 includes electrical prongs of a plug to enable to the device 2501 to be plugged into an electrical outlet on a wall, and the like, such that the rear side of the device 2501 is generally about flush with the front of the electrical outlet. The body 2511 generally includes a power supply, similar to the power supply 113, a retraction mechanism and retractable cord (e.g.

similar to the retraction mechanism 152 and retractable cord 135) connected to the T-shaped connector 2536, and optionally a battery. An electrical circuit of the faceplate 2503 further routes AC power from the plug on the rear side of the device 2501 to the electrical outlet 2599 so that devices which would otherwise plug into the electrical outlet on the wall may be plugged into the electrical outlet 2599.

Indeed, the devices described herein may be provided in other form factors and/or with other types of electrical outlets and devices, for other jurisdictions. For example, attention is directed to FIG. 26A, FIG. 26B, FIG. 26C and FIG. 26D each of which a respective front side of a device 2601A, 2601B, 2601C, 2601D, each similar to the device 2400 and including a respective body 2603A, 2603B, 2603C, 2603D, one respective connector 2631A, 2631B, 2631C, 2631D, and a respective electrical outlet 2699A, 2699B, 2699C, 2699D. Each of the connectors 2631A, 2631B, 2631C, 2631D may be similar to one or more of the connectors 131, 132, 133, 134. When a connector 2631A, 2631B, 2631C, 2631D is extendible, a respective device 2601A, 2601B, 2601C, 2601D includes a button similar to the button 155. Hence, each body 2603A, 2603B, 2603C, 2603D includes a power supply (e.g. similar to the power supply 113, but adapted for an AC mains voltage of a respective jurisdiction) and, when a connector 2631A, 2631B, 2631C, 2631D is extendible, a retraction mechanism and retractable cord (e.g. similar to the retraction mechanism 152 and/or the retractable cord 135). The respective electrical outlet 2699A, 2699B, respective electrical outlet 2699A, 2699B, 2699C, 2699D, 2699D are generally adapted for a given jurisdiction and may be flush with the front side of a respective body (e.g. the electrical outlet 2699C) or recessed (e.g. the electrical outlets 2699A, 2699B, 2699D).

Attention is directed to FIG. 27A, FIG. 27B, FIG. 27C and FIG. 27D each of which a respective front side of a device 2701A, 2701B, 2701C, 2701D, each similar to the device 2400 and including a respective body 2703A, 2703B, 2703C, 2703D, one or more respective connectors 2731 and one or more respective electrical outlets 2799. Each of the connectors 2731 may be similar to one or more of the connectors 131, 132, 133, 134. When a connector 2731 of a respective device 2701A, 2701B, 2701C, 2701D is extendible, a respective device 2701A, 2701B, 2701C, 2701D includes a button similar to the button 155. Hence, each body 2703A, 2703B, 2703C, 2703D includes a power supply (e.g. similar to the power supply 113, but adapted for an AC mains voltage of a respective jurisdiction) and, when a connector 2731A, 2731B, 2731C, 2731D is extendible, a retraction mechanism and retractable cord (e.g. similar to the retraction mechanism 152 and/or the retractable cord 135).

In particular, the device 2701A includes one electrical outlet 2799, the devices 2701B, 2701C each include two electrical outlets 2799, and the device 2701D includes three electrical outlets 2799. All the electrical outlets 2799 are of a same type. Hence, each of the devices 2701A, 2701B, 2701C, 2701D depict different alternatives of a devices which may be sold and/or provided in a given jurisdiction, for example for different size junction boxes; in other words, each of the devices 2701A, 2701B, 2701C, 2701D are generally to be wired into a junction box. Each of the devices 2701A, 2701B, 2701C, 2701D further includes one or more respective switches 2798, for example one switch 2798 for each electrical outlet 2799, the switches 2798 for turning a respective electrical outlet 2799 on and off. The devices 2701B, 2701C are similar other than in the arrangement of the connectors 2731 and the switches 2798. The device 2701D further includes a fuse box 2797 (e.g. containing a fuse for the device 2701D).

Indeed, FIG. 26A, FIG. 26B, FIG. 26C and FIG. 26D, and FIG. 27A, FIG. 27B, FIG. 27C and FIG. 27D, generally show that the devices described herein may be adapted for various jurisdictions and/or incorporate other types of electrical devices including, but not limited to, switches, fuses and the like.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some embodiments, the terms are understood to be "within 10%," in other embodiments, "within 5%", in yet further embodiments, "within 1%", and in yet further embodiments "within 0.5%".

Persons skilled in the art will appreciate that in some embodiments, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other embodiments, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative embodiments and modifications possible, and that the above examples are only illustrations of one or more embodiments. The scope, therefore, is only to be limited by the claims appended hereto.

What is claimed is:

1. A device comprising:
    an outlet faceplate having an electrical outlet-sized aperture therethrough, the outlet faceplate comprising an electrical circuit;
    a first body extending from a rear side of the outlet faceplate, the first body comprising an AC-to-DC (alternating-current to direct-current) power supply;
    a second body extending from the rear side of the outlet faceplate,
    the first body and the second body including respective electrical contacts located to electrically contact one or more respective electrical outlet terminals, the respective electrical contacts configured to provide alternating current from the one or more respective electrical outlet terminals to an AC input of the AC-to-DC power supply at least partially via the electrical circuit of the outlet faceplate; and
    at least one electrical connector, located at a front side of the outlet faceplate, connected to a DC output of the AC-to-DC power supply, the at least one electrical connector for providing DC power to an external device connected thereto.

2. The device of claim 1, wherein the first body and the second body are conjoined.

3. The device of claim 1, wherein each of the first body and the second body are rigid.

4. The device of claim 1, wherein the at least one electrical connector comprises one or more charging ports.

5. The device of claim 4, wherein the one or more charging ports includes a first charging port of a first type and a second charging port of a second type.

6. The device of claim 1, wherein the first body and the second body are located on opposite sides of the electrical outlet-sized aperture.

7. The device of claim 1, wherein the second body comprises a battery.

8. The device of claim 1, wherein the at least one electrical connector comprises one or more connectors for connecting to one or more different charging port types at the external device, the one or more connectors attached to a retractable cord located in the second body, the retractable cord connecting the one or more connectors to the DC output via the outlet faceplate.

9. The device of claim 8, wherein the second body comprises a retraction mechanism for extending and retracting the retractable cord, and the retraction mechanism comprises:
    a first geared wheel that includes: a spindle around which the retractable cord wraps; and respective electrical connections around the spindle from the retractable cord to symmetrical concentric multi-ring slip rings in electrical communication with the DC output of the AC-to-DC power supply via the electrical circuit of the outlet faceplate; and
    a second geared wheel interlocked with the first geared wheel, the second geared wheel including a spring mechanism for providing tension to the first geared wheel, to cause the second geared wheel to rotate the first geared wheel to retract the retractable cord.

10. The device of claim 9, wherein the symmetrical concentric multi-ring slip rings comprise a plurality of prongs arranged to provide stability between the first geared wheel and conducting rings of the symmetrical concentric multi-ring slip rings.

11. The device of claim 9, wherein the retraction mechanism further comprises:
    a ratchet for preventing one or more of the first geared wheel and the second geared wheel from retracting the retractable cord as the retractable cord is extended; and
    a button at the front side of the outlet faceplate, the button mechanically connected to the ratchet, the button configured to release the ratchet such that, when the button is actuated, the second geared wheel turns via the spring mechanism to cause the first geared wheel to retract the retractable cord to wrap around the spindle.

12. The device of claim 8, wherein the one or more connectors extend from a connector comprising a first connector and a second connector at about 180° to each other.

13. The device of claim 1, wherein the AC-to-DC power supply comprises one or more of: a voltage-fed buck plus push-pull topology; a current-fed buck plus push-pull topology; multi-phase flyback topology; a buck plus half-bridge topology; a buck plus full-bridge topology; and a forward convertor topology.

14. The device of claim 1, wherein the AC-to-DC power supply comprises one or more of:
    a full wave rectifier electrically connected to the AC input;
    a buck regulator in communication with the full wave rectifier to step down rectified AC voltage to a lower voltage;
    a push-pull converter, comprised of a chopper circuit in communication with the buck regulator to control a duty cycle of lower voltage rectified AC voltage, and a planar transformer in communication with the chopper circuit to further reduce voltage of the lower voltage rectified AC voltage;
    a rectifier in communication with the planar transformer to convert electrical output of the planar transformer to direct current voltage, wherein the DC output of the AC-to-DC power supply comprises an output of the rectifier;
    a feedback circuit between the DC output and the buck regulator to control the direct current voltage output from the rectifier by controlling the lower voltage output of the buck regulator;
    an optocoupler between the feedback circuit and the buck regulator to maintain isolation between a primary circuit and a secondary circuit of the planar transformer; and
    an auxiliary low voltage power supply configured to power the chopper circuit.

15. The device of claim 14, wherein the planar transformer comprises:
    a core that is less than 6.5 mm in height;
    a primary circuit comprising: a plurality of primary coils on printed circuit boards (PCBs) integrated with the core, each in a spiral shape having a center and an outer end, respective outer ends of a first primary coil and a last primary coil in communication with the chopper circuit, wherein adjacent primary coils are connected either center-to-center or outer end-to outer end, such that the plurality of primary coils form the primary circuit as a first continuous circuit in a same spiraling direction around a central portion of the core;
    a secondary circuit comprising: a plurality of secondary coils around the core, each in a circular shape and connected to form the second circuit as a second continuous circuit around the central portion of the core, respective ends of a first secondary coil and a last secondary coil in communication with the rectifier; and
insulating material between each of the plurality of primary coils and the plurality of secondary coils.

16. The device of claim 15, wherein the planar transformer comprises, around the central portion of the core:
a first layer of the insulating material;
a first primary coil;
a second layer of the insulating material;
a first secondary coil;
a third layer of the insulating material;
a second secondary coil;
a fourth layer of the insulating material;
a second primary coil;
a fifth layer of the insulating material;
a third primary coil;
a sixth layer of the insulating material;
a third secondary coil;
a seventh layer of the insulating material;
a fourth secondary coil;
an eighth layer of the insulating material;
a fourth primary coil; and
a ninth layer of the insulating material.

17. The device of claim 15, wherein thicknesses of each respective layer of the planar transformer are selected to isolate the primary circuit from the secondary circuit and to minimize isolation between same-type coils and to maximize isolation between different-type coils.

18. The device in claim 15, wherein the planar transformer comprises layers of coils of individual 2-layer printed circuit boards (PCBs), or two or more multi-layer PCBs.

19. The device of claim 14, wherein components of the AC-to-DC power supply are laid out on a printed circuit board (PCB), and wherein when respective components are one or more of greater than a PCB thickness, non-surface-mountable, and exceed a given maximum height above the PCB, the respective components are located in cutouts of the PCB.

20. The device of claim 1, wherein the electrical circuit of the outlet faceplate comprises one or more of:
first electrical routing to provide the alternating current from the respective electrical contacts to the AC input;
second electrical routing from the DC output to a retractable cord;
third electrical routing from the DC output to a battery;
a wireless network antenna to provide one or more of: external connectivity, external monitoring, external control and external programming, two-multi-way communication;
one or more of a controller and a microcontroller unit (MCU) configured for one or more of: internal device monitoring; internal and external power amplitude monitoring and modulation; internal power switching; and internal device control;
a routing circuit configured to prevent power from the DC output from being routed to at least one electrical connector when no respective external device is connected thereto, such that, when a single external device is connected to a single electrical connector, and no additional external devices are connected to other electrical connectors, the power from the DC output is routed to the single electrical connector only;
a load monitor for at least one electrical connector to firstly provide power to the at least one electrical connector from onboard battery power storage and secondly provide the power to the at least one electrical connector from the AC-to-DC power supply;
a battery monitor and charger wherein the MCU monitors and charges the onboard battery power storage when the MCU determines available power storage capacity within the battery; and
a DC-to-DC booster circuit to maintain output voltage.

* * * * *